United States Patent Office 3,531,357
Patented Sept. 29, 1970

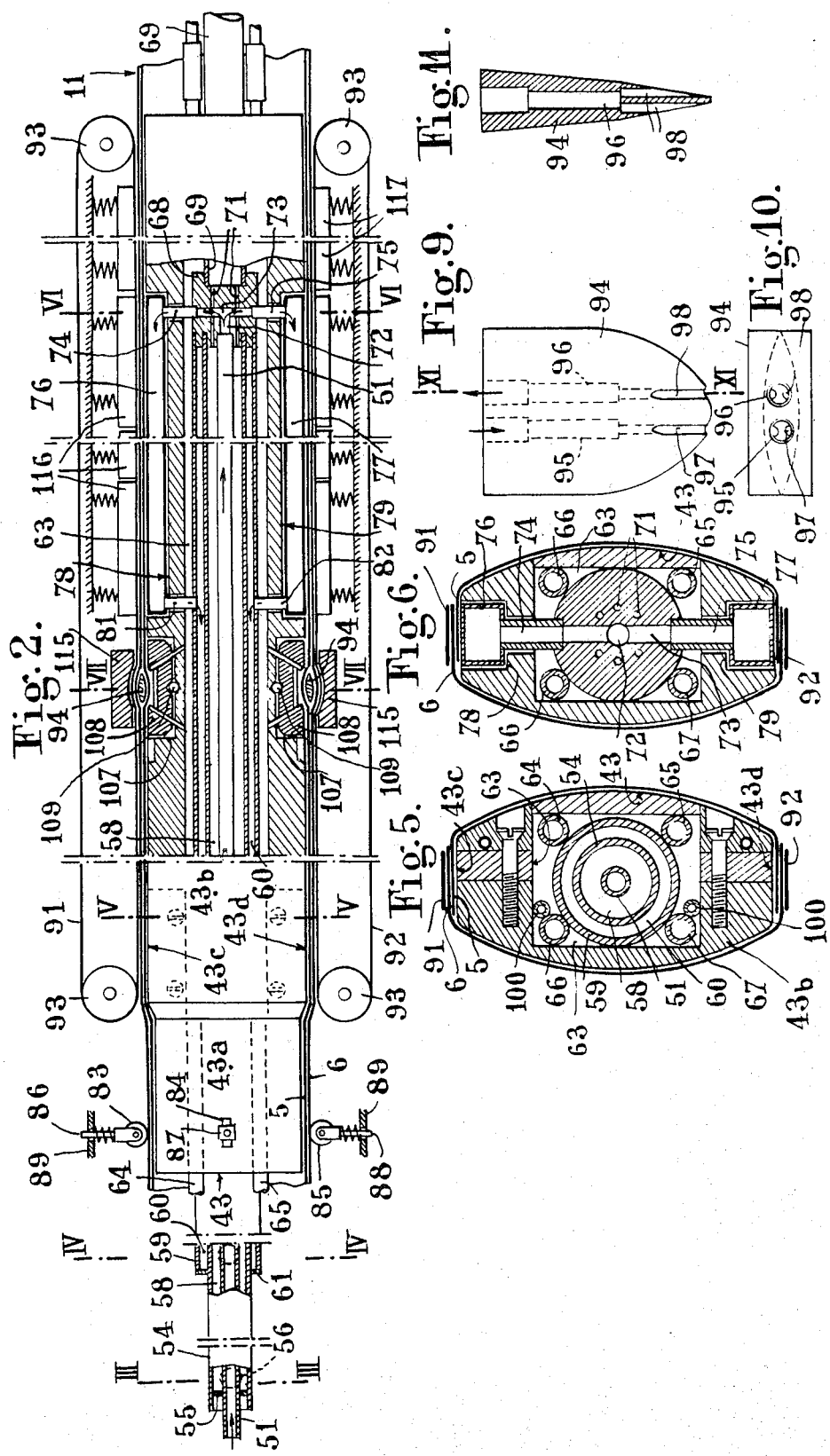

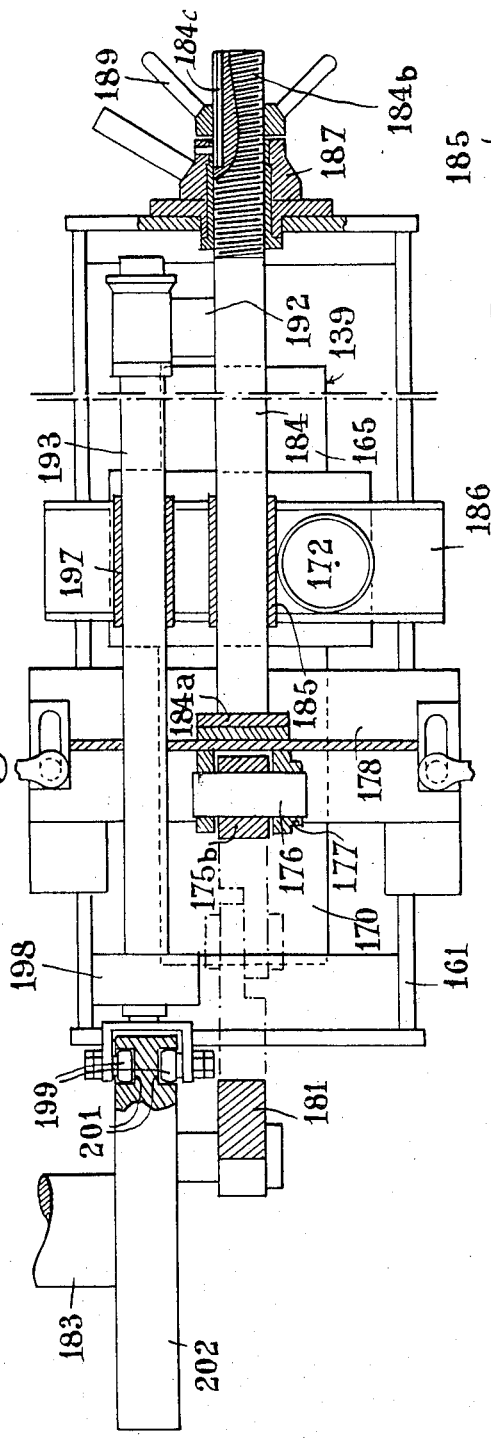
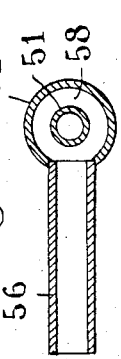
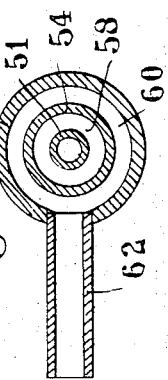
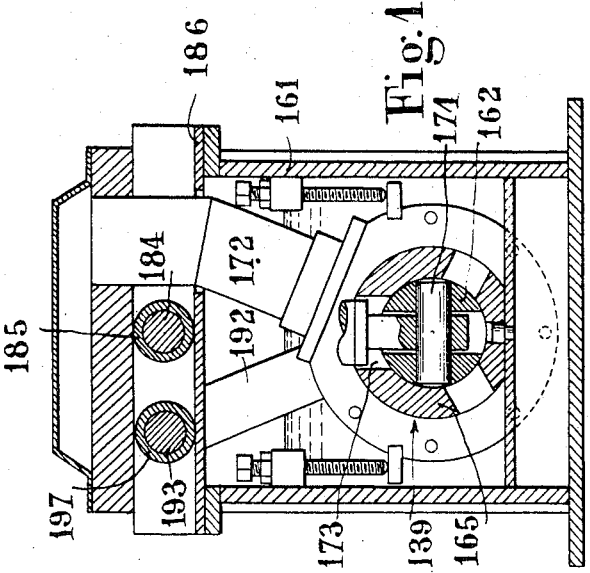

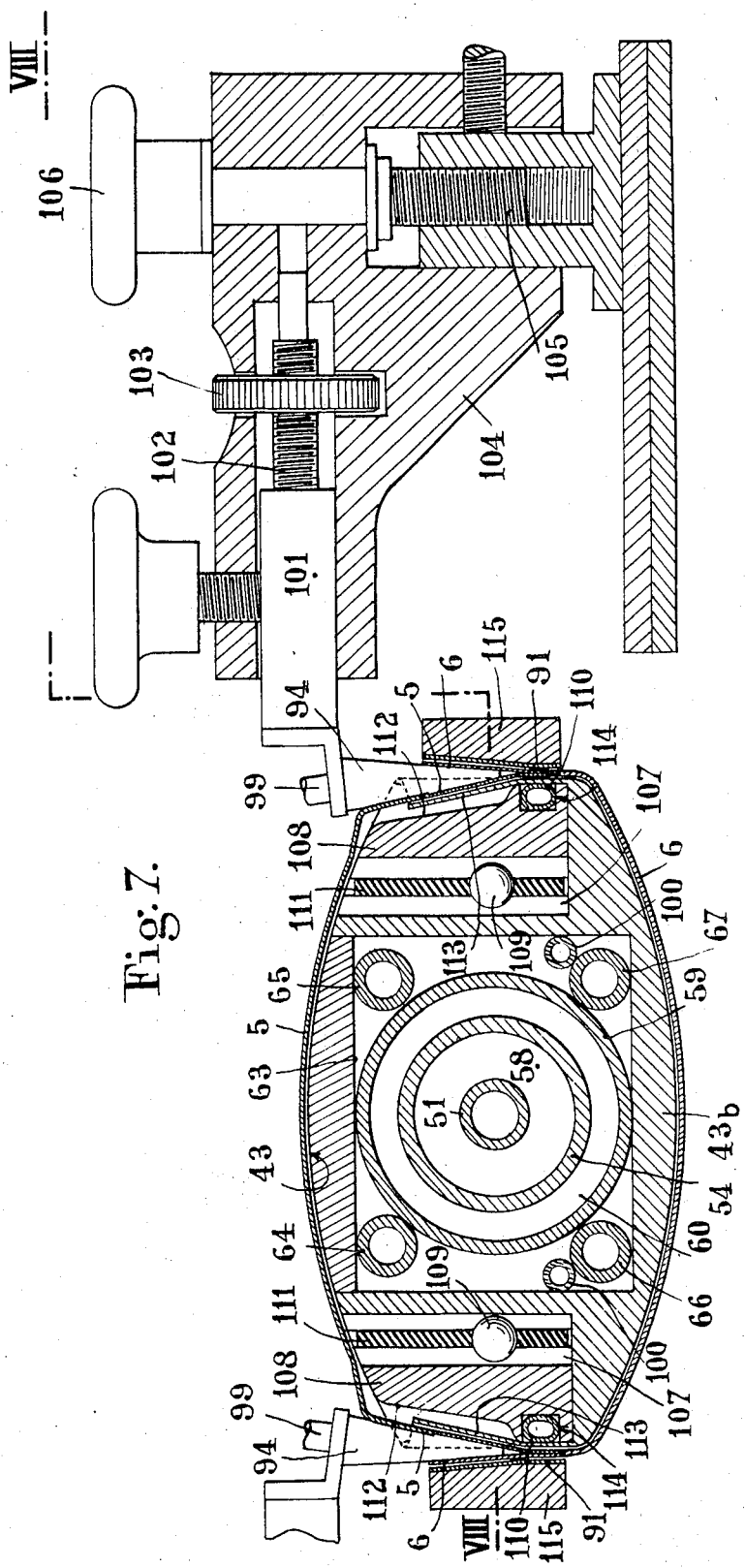

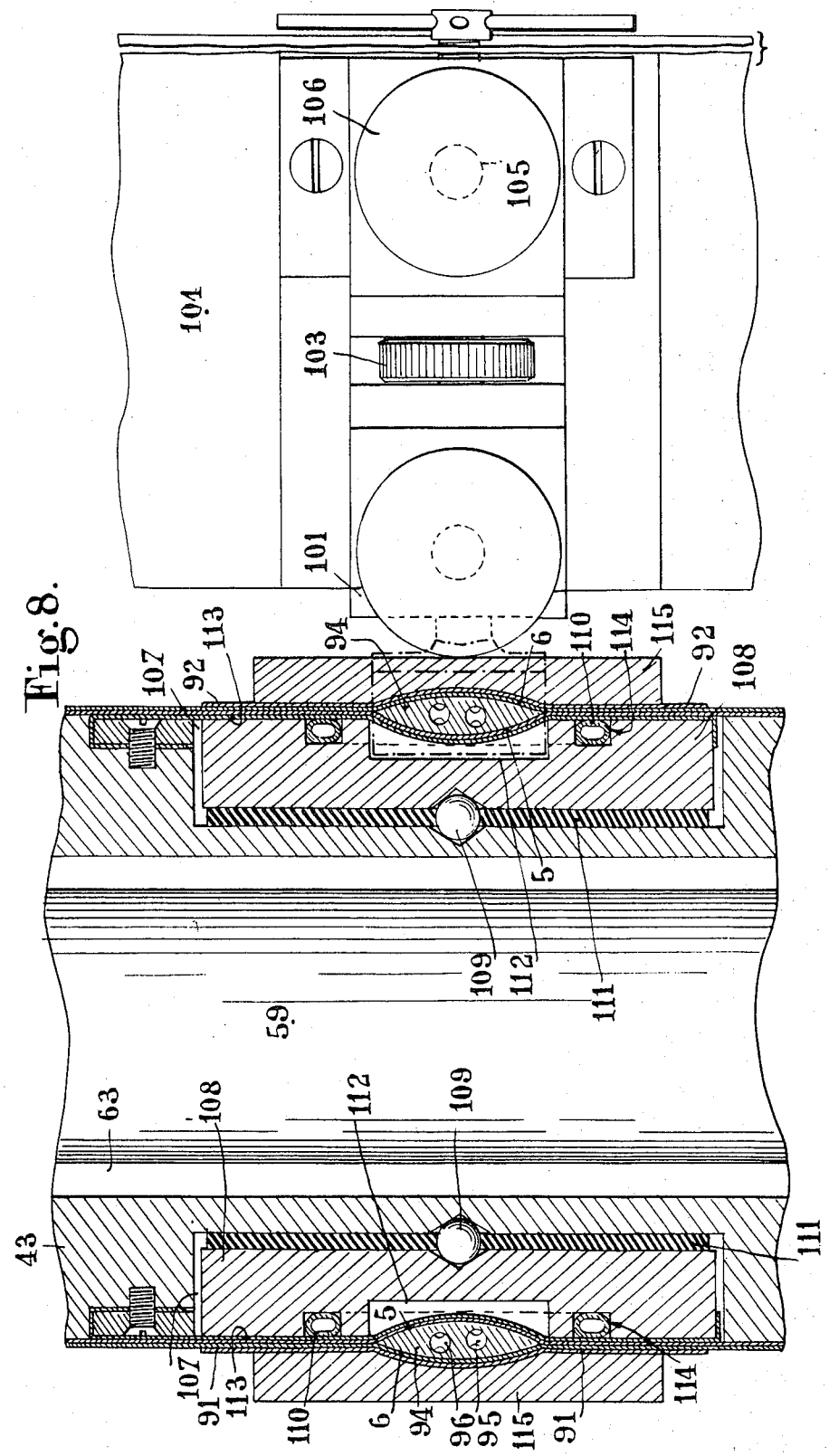

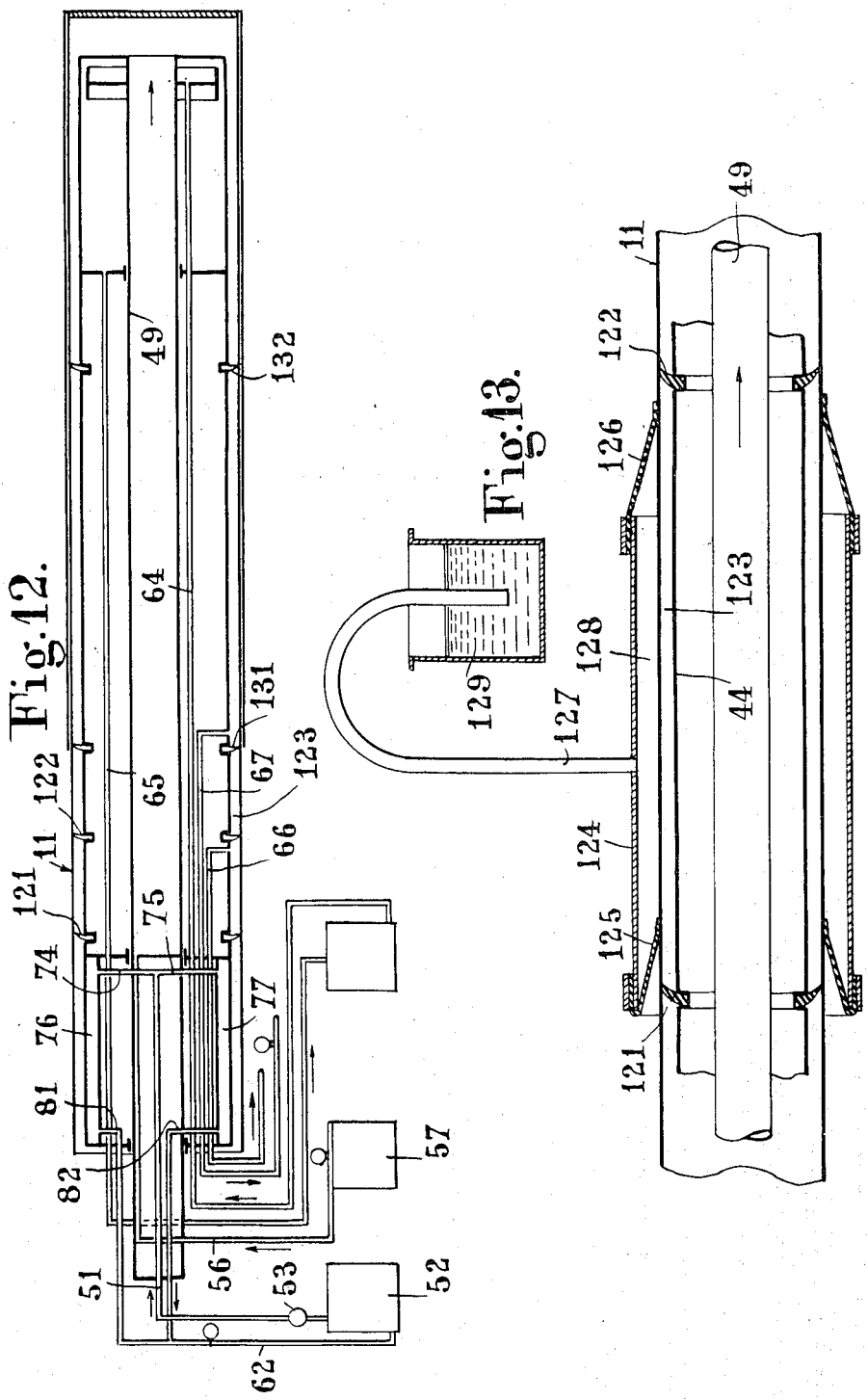

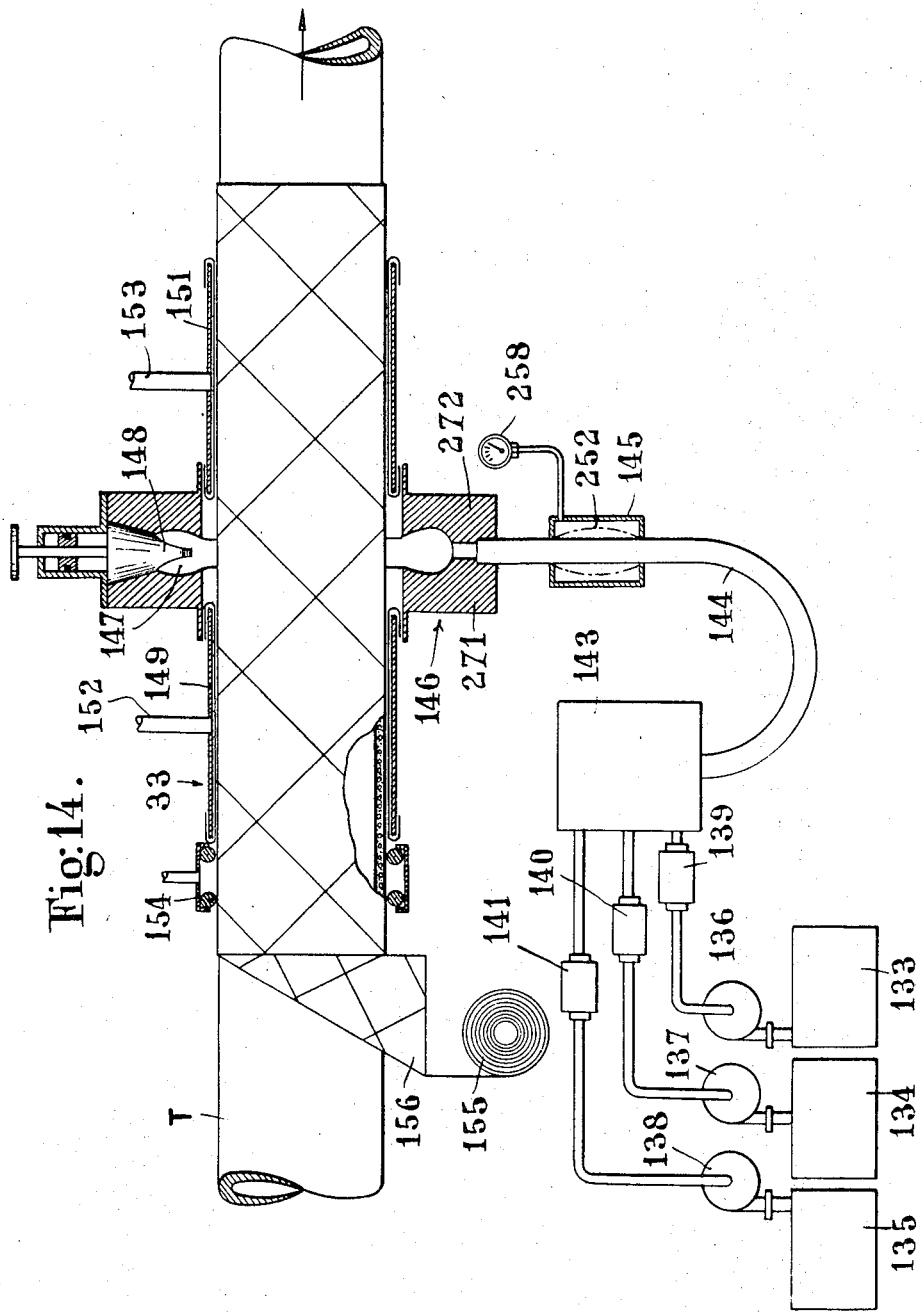

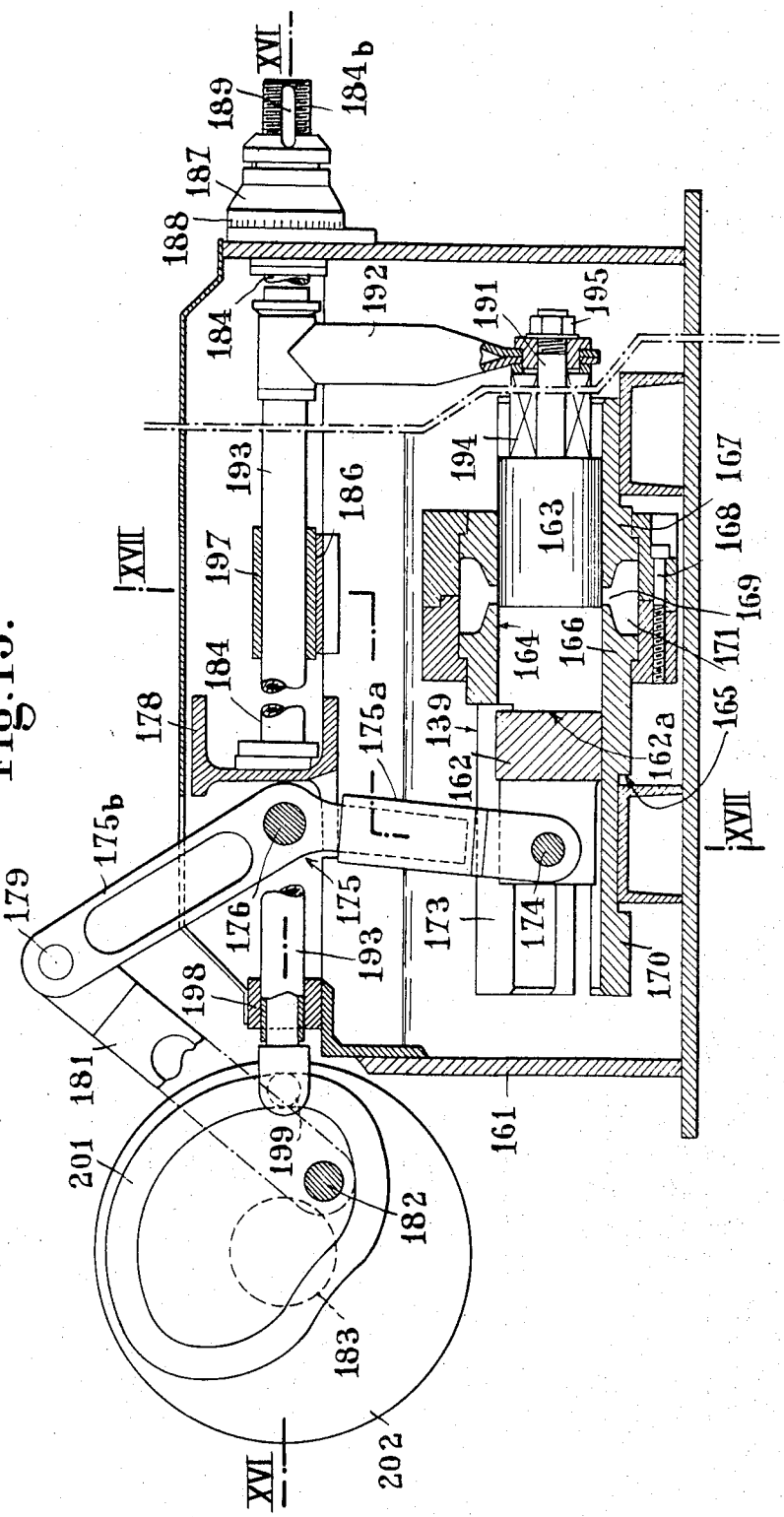

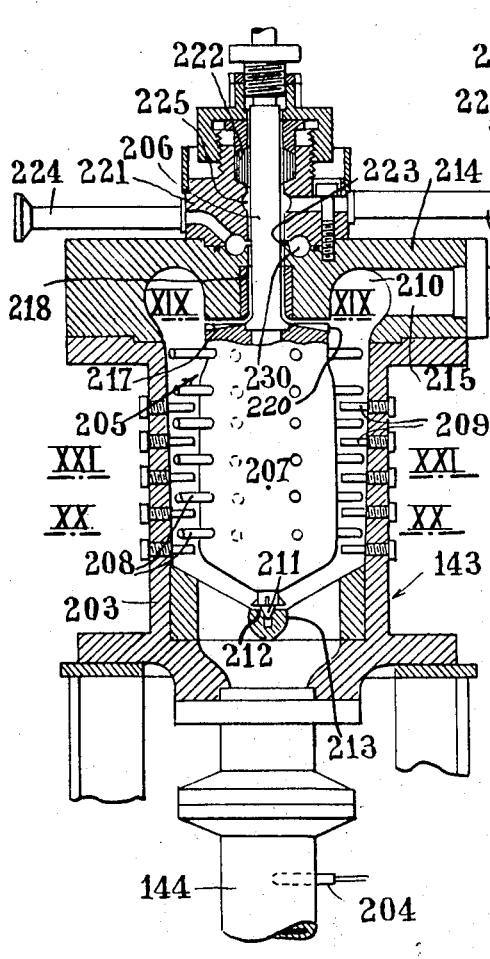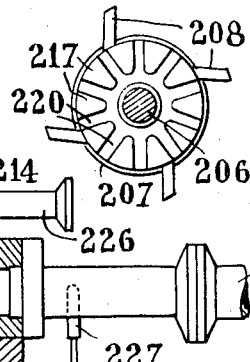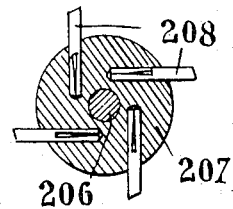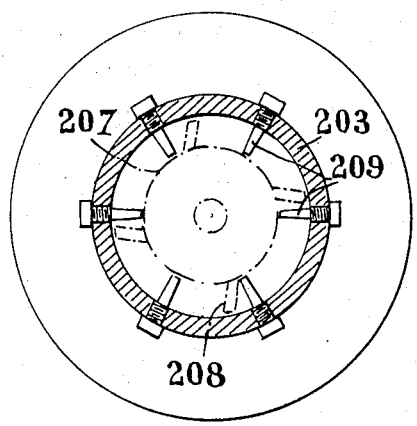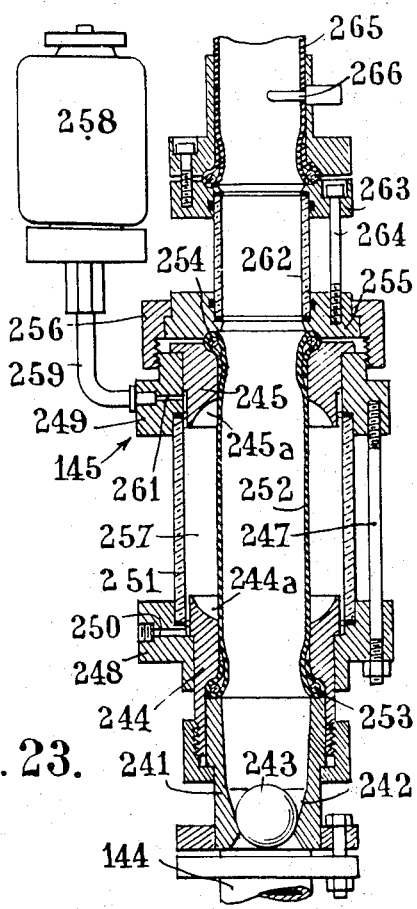

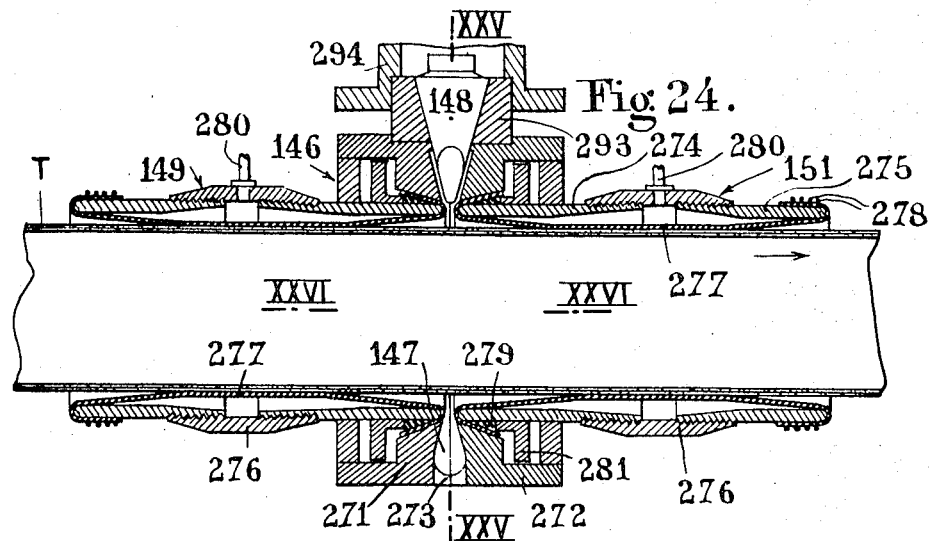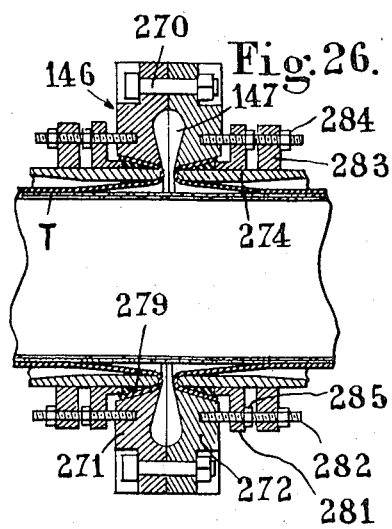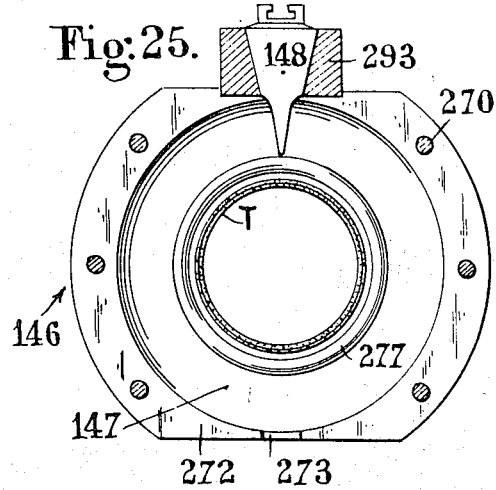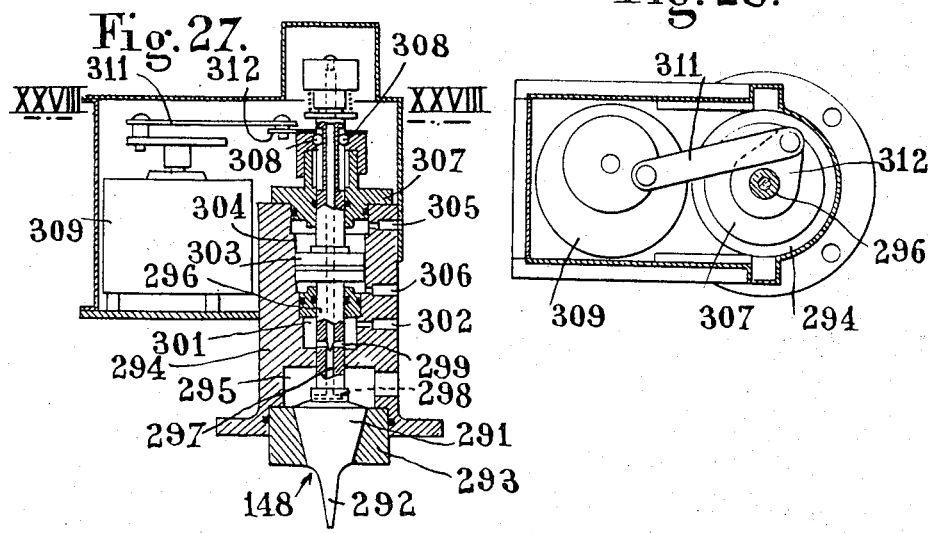

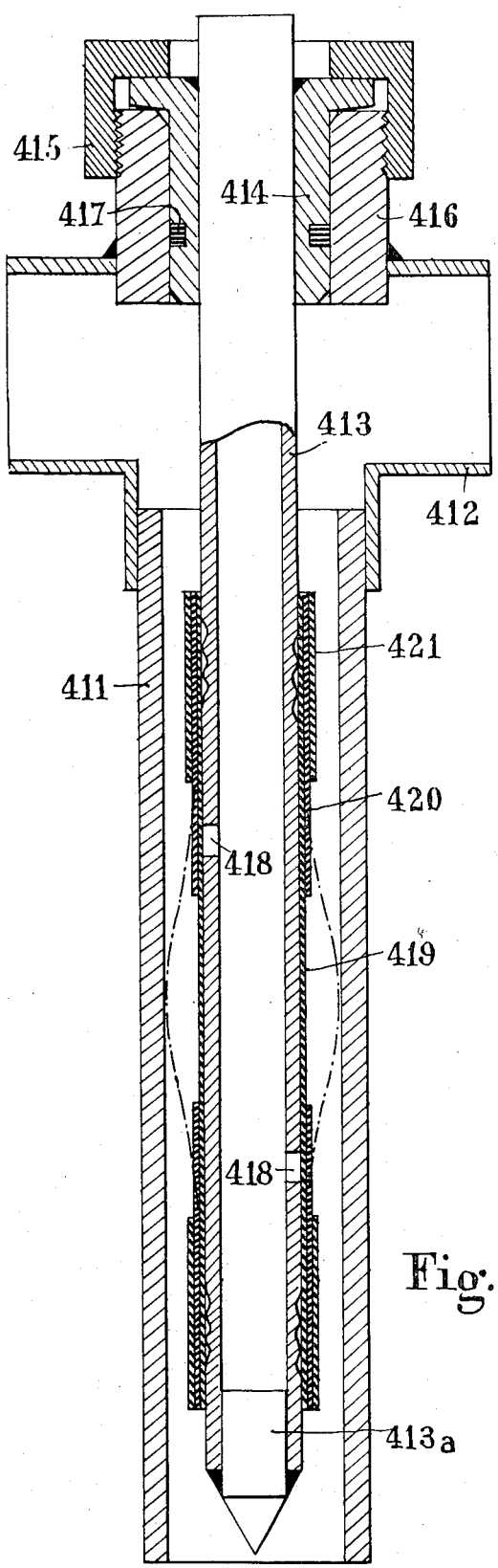
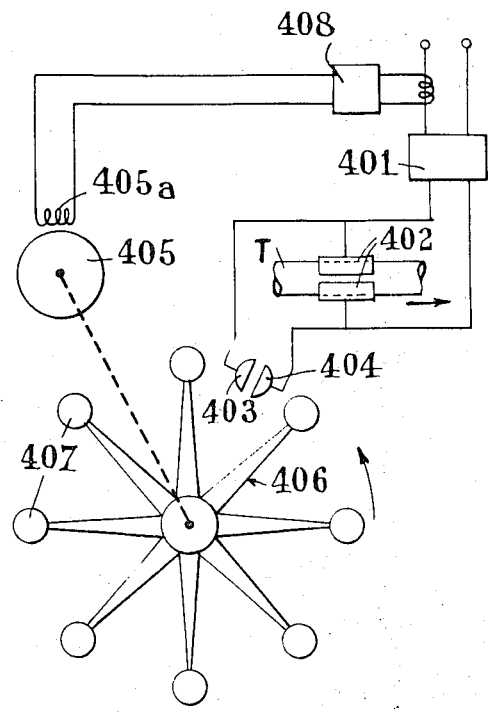
Fig. 30.
Fig. 29.

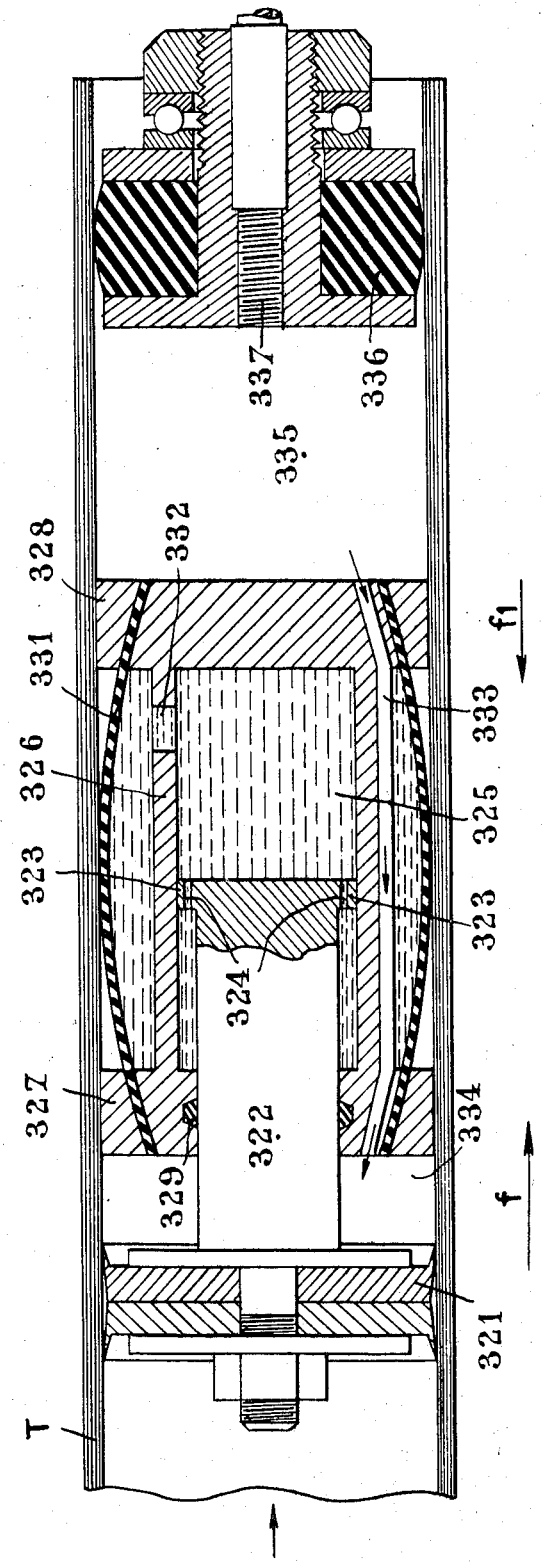

3,531,357
MACHINES FOR THE CONTINUOUS PRODUCTION OF REINFORCED PLASTIC TUBES
Claude Heckly, 134 Boulevard Bineau,
92 Neuilly-sur-Seine, France
Filed Nov. 24, 1967, Ser. No. 685,436
Claims priority, application France, Nov. 23, 1966, 84,654
Int. Cl. B31c *3/00, 11/04, 13/00*
U.S. Cl. 156—425                              34 Claims

ABSTRACT OF THE DISCLOSURE

This machine for the continuous manufacture of a reinforced plastic tube comprising a longitudinal mandrel extending along the greater part of the longitudinal dimension of the machine, is characterized in that said mandrel comprises a plurality of sections of a diameter corresponding substantially to the inner diameter of the tube being manufactured, said sections being interconnected by tubular members of smaller diameter, and that a section of relatively large diameter of said mandrel is provided at each reinforcing tape coil-winding station, at said impregnating means and along the greater part of the longitudinal dimension of the heating oven, and that furthermore annular seals are provided on some of said mandrel sections.

FIELD OF THE INVENTION

This invention relates to improvements in or relating to machine for the continuous manufacture of reinforced plastic tubes.

Machines designed for the manufacture of tubes from so-called stratified synthetic resins are already known. These tubes comprise a reinforcement of threads, fibres or fabric impregnated with a polymerizable synthetic resin. The tube is obtained by coil-winding on an mandrel tapes of said resin-impregnated threads or fibres which are subsequently fed through an oven for polymerizing the resin and hardening or setting the tube.

When a fluid-tight tube is desired an impervious sheath is formed beforehand on the mandrel and the various reinforcing tapes of threads or fibres are subsequently wound helically thereon.

SUMMARY OF THE INVENTION

This invention is concerned more particularly with improvements in a machine of the type broadly set forth hereinabove and has specific reference to means for improving the quality of the end product as well as the production rate, whereby heretofore unequalled speeds are attained in the laying of a continuous tube, irrespective of the diameter thereof which may be relatively small and very large, for instance in excess of 40".

To this end, the machine for the continuous manufacture of a reinforced plastic tube, which comprises a longitudinal mandrel extending along the greater part of the longitudinal dimension of the machine, a compressed-air feed duct provided in said mandrel for applying a pressure within the tube, a plurality of stations for helically winding the tube-reinforcing thread or fibre tapes, means for impregnating said reinforcing tapes by using a polymerizable resin, and a heating oven through which the tube consisting of the aforesaid resin-impregnated reinforcing tapes is caused to travel, is characterized in that said mandrel comprises a plurality of sections of a diameter corresponding substantially to the inner diameter of the tube being manufactured, said sections being interconnected by tubular members of smaller diameter, and that a section of relatively large diameter of said mandrel is provided at each reinforcing tape coil-winding station, at said impregnating means and along the greater part of the longitudinal dimension of the heating oven, and that furthermore annular seals are provided on some of said mandrel sections in order to isolate the inner space of the tube from zones in which different pressures prevail.

When the tube comprises an impervious inner sheath formed at the input end of the machine, said mandrel comprises at the sheath-forming station a section having a cross-sectional dimension substantially equal to that of the tube to be manufactured, and the sheath-forming station is followed by a fluid-tightness checking station.

Therefore, it is an essential feature of this inveniton that the machine constituting the subject matter thereof can be constructed from light-metal, easily deachable elements.

Due to the various zones isolated within the tube during the manufacturing process by means of said annular seals carried by the mandrel, pressure consistent with the various treatments carried out externally of the tube can safely be exerted against the inner surface of this tube.

With the machine according to this invention a fluid-tight, light, corrosion-resistant tube having a good co-effcient of friction if it comprises an internal fluid-tight plastc sheath can be obtained continuously.

The tube thus produced is also particularly economical in that the reinforcing tapes can be made for example either from unwoven threads of the type used for packing various articles and known under the name of "Bolduc," or from threads simply disposed in sheet form without any binding therebetween.

The machine according to this invention is advantageous in that it can be stopped and re-started at any time during its operation, according to production requirements. Since it utilizes as a reinforcing element dry fabrc tapes to be impregnated continuously during the subsequent manufacturing process, it is not necessary to provide a separate impregnating machine and any risk of gelling the tapes previously impregnated with resin is precluded, and besdes holds up for cleaning the machine are unnecessary.

On the other hand, if the impregnation resin is polymerized only partially in the oven a relatively flexible tube, adapted subsequently to form a more or less pronounced bend, may be produced.

The machine according to this invention can easily be mounted on a trailer or a boat for the continuous manufacture of tubes having a relatively great length.

BRIEF DESCRIPTION OF THE DRAWINGS

In order to afford a clearer understanding of this invention and of the manner in which the same may be carried out in practice, a typical form of embodiment thereof will now be described by way of example with reference to the accompanying drawings, in which:

FIG. 2 is a plan view from above with parts shown in fragmentary horizontal section, illustrating on a larger scale the mandrel section located in the station where the internal fluid-tight sheath is heat bonded to the tube;

FIG. 3 is a cross-sectional view taken along the line III—III of FIG. 2;

FIG. 4 is a cross-sectional view taken along the line IV—IV of FIG. 2;

FIG. 5 is a cross-sectional view taken along the line V—V of FIG. 2;

FIG. 6 is a cross-sectional view taken along the line VI—VI of FIG. 2;

FIG. 7 is a cross-sectional view taken on a larger scale along the line VII—VII, i.e. where the needles for injecting the adhesive substance are located on the mandrel;

FIG. 8 is a horizontal section taken along the line VIII—VIII of FIG. 7;

FIG. 9 is an elevational view showing separately a needle for injecting the bonding or adhesive substance;

FIG. 10 is a plan view of the same needle;

FIG. 11 is a vertical section taken along the line XI—XI of FIG. 9;

FIG. 12 is a diagram showing the system for delivering fluid under pressure to the mandrel;

FIG. 13 is a longitudinal diagrammatic section showing the fluid-tightness checking station;

FIG. 14 is a diagram showing the continuous impregnation station;

FIG. 15 is a vertical axial section showing a metering pump;

FIG. 16 is a horizontal section taken along the line XVI—XVI of FIG. 15;

FIG. 17 is a vertical section taken along the line XVII—XVII of FIG. 15;

FIG. 18 is a vertical section showing the mixer of the continuous impregnation system;

FIG. 19 is a horizontal section taken along the line XIX—XIX of FIG. 18;

FIG. 20 is a horizontal section taken along the line XX—XX of FIG. 18;

FIG. 21 is a horizontal section taken along the line XXI—XXI of FIG. 18;

FIG. 22 is a plan view showing the upper bearing of the mixer shaft;

FIG. 23 is a vertical axial section showing the pressure control device;

FIG. 24 is a vertical axial section showing the impregnation head;

FIG. 25 is a cross section taken along the line XXV—XXV of FIG. 24;

FIG. 26 is a horizontal axial section taken along the line XXVI—XXVI of FIG. 24;

FIG. 27 is an axial section of the valve control means provided in the upper portion of the impregnation head;

FIG. 28 is a horizontal section taken along the line XXVIII—XXVIII of FIG. 27;

FIG. 29 is a longitudinal section showing one of the valves of the impregnation device;

FIG. 30 is a diagram showing the high-frequency heating system;

FIG. 31 is a longitudinal diagrammatic section showing a device adapted to cut the manufactured tubes without creating any pressure drop therein.

PREFERRED EMBODIMENT OF THE INVENTION

Figure 1:
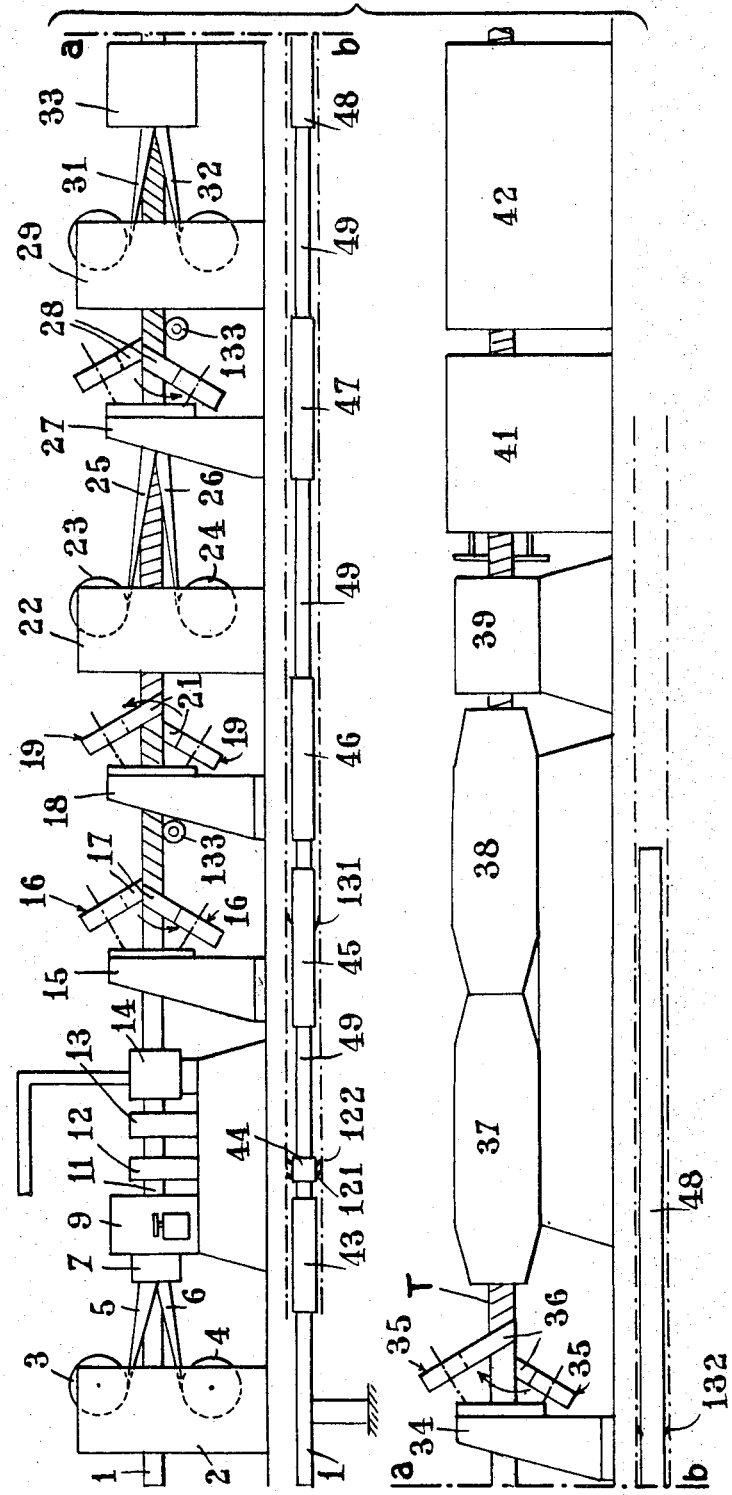
FIG. 1 is a diagrammatic elevational view of the machine, this figure being divided longitudinally into two halves separated by the line *a–b*.

Reference will first be made to FIG. 1 for briefly describing, as a whole, the machine for continuously manufacturing a reinforced plastic tube according to this invention.

This machine comprises essentially a central or axial mandrel 1 secured in overhanging relationship at its left-hand end as seen in FIG. 1, i.e. at the input end of the machine. This mandrel shown only diagrammatically in FIG. 1 extends through the greater part of the longitudinal dimension of the machine and will be described in detail presently.

The machine comprises at its input end a frame structure 2 having rotatably mounted therein a pair of coils or drums 3 and 4 from which two thermoplastic films 5 and 6 adapted to constitute the fluid-tight internal sheath of the tube are delivered. These thermoplastic films 5 and 6 are caused to assume a cylindrical configuration in a shaper 7 disposed at the input end of a welding unit 9 and as the thermoplastic films 5 and 6 emerge from this unit 9 they constitute but a single cylindrical, fluid-tight sheath 11. This sheath 11 is then fed first through a station 12 equipped with means for proofing its fluid-tightness, and then serially through a mordanting station 13 and a drying oven 14.

The fluid-tight sheath 11 emerging from the drying oven 14 subsequently travels through a first apparatus 15 having rotatably mounted thereon a ring member supporting rotary feed reels 16. These reels 16 are adapted to deliver fiberglass tapes 17 wound as a helix with an angle or pitch consistent and adjustable for each tube, on the fluid-tight sheath 11.

The sheath thus covered with the helical tapes 17 is then fed through another apparatus 18 similar to the preceding one and having rotatably mounted therein a plurality of reels 19 but opposite to the preceding ones 16. These reels 19 will thus wind on the preceding tapes 17 other fiberglass tapes 21 having their turns wound in a direction opposite to that of the preceding fiberglass tapes 17.

Of course, the machine may comprise any desired number of tape winding apparatus such as 15 and 18 without departing from the spirit and scope of the invention.

The tube thus obtained is subsequently fed through a reel off apparatus 22 carrying two reels 23 and 24 delivering longitudinal fiberglass tapes 25 and 26. This apparatus will thus reinforce the tube in the radial direction.

The machine may also comprise, as shown in the drawing, another apparatus 27 for winding a pair of helical tapes 28, followed by another longitudinal reinforcing apparatus 29 from which a pair of longitudinal fiberglass tapes 31 and 32 are taken.

The tube resulting from the superposition of the different layers of glass fibres is then introduced into an impregnation device 33 in which the fiberglass tapes are impregnated with resin. This station consists of special vacuum injectors adapted to introduce the resin and its catalyst or setting agent down to the core of the glass fibre mass.

As it emerges from the impregnation device 33 the resin impregnated tube is caused to travel through an apparatus 34 carrying a pair of rotary reels 35 for helically winding on the tube surface a pair of cellulose tapes 36 adapted to protect the still soft tube surface.

The tube is subsequently introduced into a high-frequency heating oven 37 in which the core-polymerization of the resin takes place. This operation is continued in an infrared radiation oven 38 disposed downstream of the oven 37 and adapted to complete the heat-setting of the external layers.

The tube emerging from the infrared radiation oven 38 is finished and can be delivered from the machine as a continuous product. The tube feed is obtained by using an extractor-regulator 39. For the sake of storage convenience and transport, the tube may be cut into sections by automatic cutting means 41 followed by an automatic discharge device 42.

Now the different essential features of the machine of this invention will be described more in detail with specific reference more particularly to FIGS. 1 and 2 illustrating the general arrangement of the central mandrel 1 on which the tube is formed.

This mandrel consists of a plurality of sections having an outer diameter substantially identical with the inner diameter of the tube to be manufactured. These sections are interconnected by tubular sections of smaller cross-sectional dimensions, in which various conduit means are disposed. In FIGS. 1 and 2 it will be seen that the mandrel 1 comprises a section 43 extending substantially throughout the length along which the fluid-tight sheath 11 is being formed, i.e. through the shaper 7 and welding station 9; this section 43 is followed by another section 44 lying in the fluid-tightness proofing station 12, then by sections 45, 46, 47 located at the stations where the tapes 17, 21 and 28 are helically wound on the tube, that is, at apparatus 15, 18 and 27, and by another section 48 extending from the impregnation station 33 to the interior of the infrared radiation heating oven 38, all these sections 43 to 48 having a cross-sectional dimension corresponding to the inner diameter of the tube and being interconnected by tubes 49 of small diameter.

The mandrel 1 therefore consist of an assembly of separable elements comprising said sections and connecting tubes, which are made from suitable light metal stock, the machine comprising one such assembly per tube diameter contemplated.

Firstly, a detailed description of the machine portion in which the fluid-tight sheath is welded will be described, i.e. where the mandrel section 43 is used (see FIG. 2).

Housed inside this section 43 is an axial central tube 51 having its left-hand end connected to a source of hot oil 52 (FIG. 12) forced by a pump 53. The tube 51 is surrounded by another, coaxial tube 54 (FIG. 2) having its left-hand end closed by a transverse annular wall 55, a pipe line 56 connected to a suitable source of compressed air 57 (FIG. 12) opening into this coaxial tube. The annular space 58 formed between the central and coaxial tubes 51 and 54 is thus filled with compressed air at a relative pressure which may be for example of the order of 5 to 6 bars (72 to 87 p.s.i.).

A third coaxial tube 59 (see FIG. 2) surrounds the tube 54 and its left hand end is closed by a transverse wall 61. Connected to this third tube 59 is a cold-oil return pipe line 62 leading to the hot oil reservoir 52 (FIG. 12) and thus opening into the annular space 60 formed between tubes 54 and 59.

The three coaxial tubes 51, 54 and 59 extend through a longitudinal cavity 63 formed in the first mandrel section 43, together with other pipe lines such as 64 (for supplying cold water), 65 (cold water return), 66 and 67 (compressed-air exhaust lines).

The coaxial tubes 51, 54 and 59 are secured to one face of a cylindrical member 68 also mounted in the mandrel cavity 63. Secured to the other face of this cylindrical member 68 is a tube 69 of which the inner space communicates via duct means 71 with the annular space 58 formed between the coaxial tubes 51 and 54 and connected to the source of compressed air.

The aforesaid cylindrical member 68 has also formed therethrough a longitudinal duct 72 communicating at one end with the inner space of said central tube 51 and opening at the opposite end into a transverse duct 73 connected through pipes 74 and 75 to a pair of lateral heat transfer devices 76 and 77 consisting of rectangular-sectioned tubes. These heat transfer devices 76 and 77 are disposed in corresponding recesses 78 and 79 formed in the lateral surface of mandrel section 43 in the zone where the fluid-tight sheath is to be welded. The upstream ends (with respect to the direction of feed of the tube being manufactured) of said heat transfer devices 76 and 77 are connected via ducts 81 and 82 to the annular space 60 formed between the intermediate or coaxial tube 54 and the external tube 59. Under these conditions it is clear, as shown in FIGS. 2 and 12, that a hot oil circulation takes place continuously from the reservoir 52, via the innermost tube 51, heat transfer devices 76 and 77, annular space 60 and return line 62 to reservoir 52.

Now the manner in which the fluid-tight sheath is bonded will be described. This sheath is formed from a pair of thermoplastic films or tapes 5 and 6 paid out from reels 3 and 4 (FIG. 1). These films 5 and 6 are given a substantially cylindrical configuration by a shaper 7 (FIG. 1) whereby their edges overlap along flat lateral surfaces 43c and 43d of the mandrel, as clearly shown in FIG. 5. The cross-sectional configuration of the mandrel is substantially flattened and bulged. This mandrel consists of two sections 43a and 43b having different cross-sectional configurations. Thus, the upstream section 43a has a smaller cross-sectional dimension and the two thermoplastic films 5 and 6 are shaped thereon. These are subsequently overstressed during their passage on the downstream section 43b having a somewhat larger cross-sectional dimension. With this arrangement the variations in diameter of the welded sheath can be reduced appreciably.

The surface of the smaller mandrel section 43a is engaged by three rollers 83, 84 and 85 rolling on the thermoplastic films 5 and 6; these rollers are pivotally mounted on corresponding transverse pins 86, 87 and 88 carried by a transverse frame structure 89. Thus, the angular setting of rollers 83, 84 and 85 may be adjusted with a view to produce a transverse shift of the thermoplastic films 5 and 6, so that they properly overlap on the mandrel portion 43b.

The flattened shape of the mandrel is advantageous in that it permits of reducing the mandrel length necessary for shaping the fluid-tight sheath. In fact, the distortion of the thermoplastic films 5 and 6, which are initially flat and must subsequently take a substantially semi-circular cross-sectional configuration, takes place much more easily on a mandrel of this specific shape. Thus, a suitable shape can be obtained along a mandrel length corresponding approximately to four times the largest diameter, if a flattened mandrel is used, as contrasted with ten times the diameter of the mandrel were round-sectioned.

The fluid-tight sheath may also be constructed by using a single thermoplastic film of a width sufficient to be shaped into a cylinder having the requisite diameter. If the film is thin a conventional shaper may be used.

The thermoplastic films 5 and 6 bent on the upstream portion 43a of the mandrel are subsequently driven on the downstream portion 43b of the mandrel by a pair of endless belts 91, 92 pressed against the flat side faces 43c and 43d of said mandrel portion 43b. These belts 91 and 92 are passed over driving and return pulleys 93.

Another pair of similar endless belts may be provided which contact the thermoplastic films 5 and 6, and are disposed in a vertical plane in order to avoid any undesired twisting during the welding or bonding step.

In the case of large-diameter tubes, a counter-bearing endless belt may be provided within the mandrel to facilitate the slipping contact.

The two thermoplastic films 5 and 6 are welded or bonded to constitute the cylindrical fluid-tight sheath 11 in any suitable and known manner, for example by ultrasonic welding, high-frequency or induction heating, welding by means of a polyethylene strip, etc.

In the specific form of embodiment illustrated in the drawings this bonding step is carried out by using heat. To this end two needles 94 for injecting an adhesive substance (metacresol) are inserted between the overlapping edges of the thermoplastic films 5 and 6. Since the injection of this adhesive substance takes place in the same manner on either side of the mandrel, only the means provided on one side of the mandrel will be described in detail. Each injection needle 54 (FIGS. 9, 10 and 11) has the appearance of an elongated block in which a pair of vertical parallel ducts 95 and 96 are formed; these ducts open to the outside, at the lower portion of the needle, by means of a pair of orifices 97, 98 formed on two lateral faces of this needle. These two ducts are connected through pipe lines 99 (FIG. 7) to a metacresol-containing reservoir and to a pump (not shown) for producing a continuous circulation of metacresol, one duct such as 95 being used for delivering the metacresol and the other 96 for returning the residual metacresol to the reservoir.

Each needle 94 is mounted on a support 101 rigid with a screw rod 102 engaging a nut 103 for lateral adjustment. The aforesaid support 101 is mounted for lateral slide movement in a needle carrier 104 of which the vertical position is also adjustable by means of a screw rod 105 provided with an adjustment knob 106.

At the location contemplated for the bonding needles 94 the mandrel section 43b comprises on either side a cavity 107 in which a sealing pad 108 is housed. This pad is pivoted on a ball 109 disposed between recesses formed in the surface of pad 108 and in the bottom of said cavity 107. A layer of cellular rubber 111 is disposed between the bottom of said cavity 107 and the sealing pad 108. This pad 108 has formed on its outer face a recess 112 inclined upwards and lined like the other portions of the surface of pad 108 with a layer 113 of polytetrafluoroethylene material such as "Teflon" (a registered trademark) to improve the sliding contact. The recess 112 is also surrounded by a U-sectioned groove 114 receiving therein a tubular packing 110 inflated at a pressure of about 2 bars (29 p.s.i.).

Both packings 110 provided for preventing leakages of adhesive substance are connected in series to a pair of compressed-air supply lines 100 (FIGS. 5 and 7) housed in the recess 63.

Externally of each needle is a bearing block 115 made from a material adapted to facilitate the sliding contact between the parts, such as "Teflon," this bearing block 115 being shaped to permit the insertion of the injection needle 94 between this block and the corresponding recess 112 formed in the sealing pad 108.

As clearly shown in FIGS. 7 and 8 of the drawings the marginal portion of the thermoplastic film 5 travels inside between the injection needle 94 and the "Teflon" layer 113, and the other thermoplastic film 6 engaging the endless drive belt 91 or 92 moves between the injection needle 84 and the external bearing block 115.

Under these conditions, the injection needle 94 delivering the adhesive material will deposit a layer of this material between the registering and overlapping marginal portions of the thermoplastic films 5 and 6. These marginal portions are pressed against each other and also against the mandrel by the endless drive belts 91 and 92. They are thus carried (as shown in FIG. 2) along the external surface of the heat transfer devices 76 and 77 in which hot oil is circulated, as already disclosed, these heat transfer devices bonding the layer of adhesive with each other and therefore causing the two thermoplastic films 5 and 6 rigidly to adhere to each other.

Downstream of the injection needles 94 supplying the adhesive material for assembling and bonding the thermoplastic films 5 and 6, these films 5 and 6 and the endless driving belts 91, 92 are pressed against the lateral heat transfer devices 76 and 77 by the external heating pads 116 resiliently urged by spring means against the lateral surface of the mandrel. These heating pads are hollow and a suitable heating fluid (air or oil) is circulated therethrough by adequate pumping means (not shown).

With the above-described arrangement a fluid-tight, cylindrical sheath 11 formed with two bonded lateral seams or joints emerges from the downstream end of mandrel section 43.

Downstream of the heat-welding station 9 is a fluid-tightness proofing station 12 illustrated diagrammatically in FIG. 13. At this station the central mandrel comprises a cylindrical section 44 of which the diameter corresponds substantially to the internal diameter of the tube being manufactured. On this mandrel are mounted a pair of annular packings, i.e. an upstream packing 121 and a downstream packing 122. An annular chamber 123 is thus formed between these two packings, on the one hand, and between the lateral surface of mandrel section 44 and the fluid-tight sheath 11, on the other hand.

Externally of this sheath is a coaxial sleeve 124 also provided with a pair of annular sealing packings engaging the sheath 11, i.e. an upstream packing 125 and a downstream packing 126. A pipe 127 emerges at one end into the annular space 128 formed between the sleeve 124 and the fluid-tight sheath 11, and at its other end into a water-filled vessel 129.

As will be explained presently, a slight overpressure is maintained in the internal annular space 123 with respect to the surrounding atmospheric pressure and if the sheath is not strictly fluid-tight air will flow therethrough into the pipe 127 and escape in the form of bubbles through the water contained in said vessel 129. Thus, a visual evidence of the fluid-tightness of sheath 11 will be had. Pressure-gauge means may also be used for checking this fluid-tightness, if desired.

The fluid-tightness proofing station 12 may be followed if desired by a repair station consisting in fact of a cylindrical mandrel section reserved for this specific purpose, with various known means for bonding the films, these means depending on the specific quality and type of thermoplastic film implemented. Thus, a solvent injection needle may be used to this end, if Superpolyamid 11 (Rilsan) is used, and an iron heated by air or otherwise for melting the plastic material, or any other conventional means such as ultrasonic and high-frequency heating means, may also be used.

The sheath 11 of which the fluid-tightness has been checked at station 12 is subsequently led through the mordanting station 13 where it is oxidized to improve the subsequent adherence of the impregnation resin.

This mordanting operation may be carried out, as illustrated in FIG. 1, on the machine itself. In this case the sheath 11 is caused to travel through a coaxial sleeve provided with an upstream sealing packing and a downstream sealing packing (similar to the seleeve 124 of the fluid-tightness proofing station of FIG. 13) and the annular space thus formed between this sleeve, the sheath and the packings is fed with an oxidizing substance by means of a pump connected to a suitable source (not shown).

This mordanting operation may also be carried out on the machine immediately after the films 5 and 6 have been fed from the reels 3 and 4.

It may also be carried out outside the machine by using a special apparatus and in this case a pair of reels 3 and 4 provided with previously mordanted films are mounted on the machine.

The fluid-tight sheath 11 thus mordanted is subsequently passed through a drying oven 14 shown in FIG. 1, and then through a plurality of helical winding stations such as 15 and 18 whereat fiberglass tapes such as 17 and 21 illustrated in FIG. 1 are helically wound. The machine comprises as many helical winding stations as required for obtaining the desired tube thickness, this number of winding stations depending also from the thickness of the fiberglass tapes utilized.

These fiberglass tapes may also be pre-impregnated with a thermosetting resin or any other product adapted to be polymerized or cured.

The winding stations 15, 18 . . . etc. are equipped for winding tapes consisting of longitudinally disposed fiberglass yarns, without any weft bindings. The fiberglass sheets thus obtained may be separated from each other by sheets of thicker threads consisting for example of "Verranne," with a view to increase the thickness of the reinforcing layer. In other words, one station, for example station 15, is designed for helically winding silicon-type glass fibres or yarns, and the next station, for example station 18, is designed for winding thicker threads to increase the thickness of the reinforcing layer. This technique is attended by a reduction in the surface-unit strength and is therefore applicable only to tubes intended for subsequent use at low or medium internal service pressures.

The reel shafts, such as of reels 16 and 19 of FIG. 1, are braked in order to keep the thread tapes under a constant tension during the winding operation.

Means are also provided for varying the velocity of rotation of winding stations 15, 18 . . . etc. This speed variation may be obtained by using a differential reduction gearing of which the fixed point is caused to rotate in a predetermined direction at a variable speed obtained by using an irreversible reduction gearing and a small D.C. motor of the adjustable-speed type. This device is advantageous in that it operates with a high degree of precision if only a relatively narrow speed range is required.

As shown in FIG. 1, a large-diameter mandrel section is associated with each helical winding or reinforcing station; thus, sections 45, 46, etc. are associated with stations 15, 18, etc. In FIG. 1 it will also be seen that section 45 carries an annular sealing packing 131 in frictional contact with the inner surface of the fluid-tight sheath 11 in order to form with another sealing packing 132 mounted on the last mandrel section 48 approximately at the location of the last winding station 34 a chamber in which a medium-value compressed-air pressure (such as 2.5 bars or 37 p.s.i.) prevails.

This mean pressure produces a mean tension in the glass fibre threads sufficient to prevent any excessive tightening of the fluid-tight sheath 11 on the mandrel sections 45, 46, 47, which is obviously caused by the helical winding of tapes 17, 21 and 28.

The tube is supported during its manufacture by a plurality of motor-driven and swivelling carrier rollers 133A. Preferably, these rollers are inflatable to increase the bearing surface area and reduce the bearing pressure which, if allowed to become excessive, would cause a rupture of the glass fibre threads. These carrier rollers 133A are driven in synchronism with the tube feed rate, or more simply their reaction torque is zeroed or compensated.

The equilibrium between the tightening pressures produced at two adjacent winding stations, such as 15 and 18, in conjunction with the angular setting of carrier rollers 133A, prevents the twisting of the fluid-tight sheath 11.

Various known means may be used for preventing this undesired twisting of the fluid-tight sheath. If the reinforcing layers are made of translucent material, a longitudinal opaque trace may be formed thereon at the fluid-tight sheath bonding station whereby the possible twisting can be detected visually by simply using some internal lighting means.

In case the reinforcing layers are opaque, another means may be used; thus, a longitudinal trace of metal paint may be deposited on the sheath, and a magnetic control head may be used for automatically controlling as a function of any detected twist the tension of the reinforcing glass fibre tapes.

The twisting may also be eliminated by providing a frame structure delivering tensioned longitudinal threads. As a rule, there may be provided between each pair of adjacent helical winding stations a frame structure adapted to deliver longitudinal threads or tapes. With this arrangement the density of the stratified layer formed by the machine can be reduced or increased by increasing or reducing respectively the relative spacing of these longitudinal threads. However, the layer laid just before the actual impregnation operation should be complete in order to avoid the movement of the turns during the tightening resulting from the impregnation.

The reels feeding the aforesaid longitudinal threads are provided for example with braking means permitting of controlling the tube delivery rate. This rate may also be controlled by using a tachometric current generator driven from a tangent wheel of which the reaction torque is reduced to zero by an auxiliary motor. This generator controls the main driving motor of the machine, i.e. the motor driving the various helical winding stations and the stations where the fluid-tight sheath is formed, as described hereinabove.

Another suitable control system may also be used without braking the longitudinal threads or tapes. Thus, this system may consist of an endless belt-link plate regulator disposed adjacent the polymerization ovens 37 and 38, and set near to or spaced from the tube, according to requirements. This regulator controlled by a D.C. generator as in the example suggested hereinabove is adapted to set the tube output rate but is less efficient as far as sheath twist control is concerned.

The complete machine may be driven from an electro-mechanical unit comprising for example a motor driving an electromagnetic or hydraulic coupler, or a roller-type speed variator or any other suitable variable-speed gearing driving in turn a main shaft operatively connected to the helical winding stations and the sheath-forming station.

As already explained hereinabove, the velocity of rotation of the helical winding stations is variable to permit their adaptation to different glass-thread tape widths and tube diameters. The velocity of rotation of one helical winding station is actually subordinate to the production rate, the tube diameter and the width of each helically wound tape.

Now reference will be made more particularly to FIG. 14 to describe in general the station 33 whereat the various reinforcing layers constituting the tube are continuously impregnated with resin. This station comprises three reservoirs 133, 134 and 135 containing respectively a resin, a catalyst and a solvent, generally styrene. The liquid products contained in these reservoirs are drawn and forced by corresponding suction and delivery pumps 136, 137 and 138, respectively, towards metering pumps or like devices 139, 140 and 141. These metering pumps are connected to a stirrer 143 having its outlet (at the lower portion of the stirrer body) connected to a vertical branch of a U-shaped pipe 144. The other vertical branch of this U-shaped pipe extends through a device 145 for controlling the pressure of the impregnation liquid in said tube 144. At its upper end the U-shaped pipe 144 opens into an impregnation head 146 of substantially annular configuration through which the tube T is caused to pass and having formed therein a substantially annular chamber 147. A pivoting valve 148 is mounted in the impregnation head 146 and projects into said annular chamber 147 at a point diametrally opposite to the inlet connected to said pipe 144.

Disposed on either side of the impregnation head 146 are annular sealing cushions or bladders 149 and 151 through which the tube T is caused to travel. These inflatable sealing cushions 149 and 151 are connected respectively through pipe lines 152 and 153 to vacuum or compressed-air sources (not shown) according as the seals must be deflated to permit the passage of the tube reinforcements, or inflated for sealing purposes.

Upstream of the upstream seal 149 is an annular vacuum chamber 154 formed between a pair of parallel annular sealing packings receiving the tube T therethrough.

Also upstream of the impregnation device is a reel 155 carrying a fabric strip 156 adapted to constitute a friction filter. The strip 156 paid out from this reel 155 is shaped into a cylindrical sheet surrounding the tube T before the latter penetrates into the impregnation head 146.

According to a modified form of embodiment, an accelerator-containing reservoir may be provided in addition to the reservoirs containing the resin, catalyst and solvent, this additional reservoir supplying the stirrer 143 with a substance adapted to accelerate the polymerization reaction.

According to another modified form of embodiment, the catalyst may be applied separately to the tube T upstream of the impregnation device proper. In this case the stirrer 143 and the impregnation head 146 deliver a resin and accelerator mixture.

Now a detailed description of the various component elements of a continuous impregnation station will be given with reference to FIGS. 15 to 28 of the drawings.

However, reference will firstly be made to FIGS. 15 to 17 illustrating a specific form of embodiment of one of the metering pumps feeding the stirrer 143, for example the metering pump 139 delivering resin to said stirrer 143.

This pump 139 of the immersed type is housed in a resin-filled vessel 161 fed by means of the companion pick-up pump 136. The metering pump 139 characterized in that it is a valveless pump comprises two tandem pistons 162 and 163 reciprocated in a bore 164 formed in a pump body 165. This pump body 165 comprises two elements 166 and 167 assembled by screws 168. The registering front faces of these elements 166 and 167 provide therebetween an annular port or recess 169 together with an annular chamber 171 communicating via said port 169 with the central bore 164. The annular chamber 171 is connected to a delivery duct 172 connected in turn to the stirrer via a suitable pipe line (not shown).

The piston 162 is mounted for longitudinal sliding movement in the element 166 of the pump body having a cylindrical extension 170 at its rear end which has a longitudinal slot 173 formed in its upper portion.

This piston 162 has pivoted thereon by means of a cross pin 174 the lower end of one arm 175a of a bell-crank lever 175 inserted in said slot 173. This lever is fulcrumed on a pivot pin 176 trunnioned in a support 177 rigid with a base member 178 of which the longitudinal position is adjustable. The upper arm 175b of bell-crank lever 175 has one end pivotally connected by means of a pin 179 to a link 181 rotatably driven through suitable means (not shown) about a shaft 183.

From the foregoing it is clear that the movement of rotation of roller 182 about the shaft 183 is attended by a reciprocating motion of bell-crank lever 175 about its fulcrum 176 and therefore by a to-and-fro movement of piston 162 in bore 164.

The stroke of piston 162 is adjustable by longitudinally displacing the fulcrum 176 of bell-crank lever 175. The adjustment of the longitudinal position of this fulcrum is effected by means of a longitudinal rod 184 slidably mounted in a fixed bushing 185 rigid with a cross member 186 secured to the resin-containing vessel 161. One end 184a of rod 184 is secured to the base member 178 and its other end 184b is screw-threaded and extends through the lateral wall of vessel 161. This screw-threaded end 184b has screwed thereon an adjustment nut 187 carrying on its outer periphery a circular scale 188 movable past a fixed index. On the other hand, the end 184b of rod 184 has a longitudinal slot 184c formed therein which has inserted therein a graduated vernier 189.

With the above-described arrangement the position of the fulcrum 176 of lever 15 and therefore the stroke of piston 162, i.e. the pump output, can be adjusted during the operation of the machine. This adjustment may be located by means of the circular scale 188 and the graduated vernier 189.

The counter-piston 163 is slidably mounted, as already explained, in the element 167 of pump body 165. The piston 163 has a rod extension 191 extending through a radial arm 192 secured to a longitudinal rod 193. The rod 191 of piston 163 is mounted for free sliding motion in the end of arm 192. A spring 194 (consisting for example of stacked dished washers) is disposed between the piston 163 and arm 192 so as to constantly urge the piston 163 away from arm 192. The rod 191 of piston 163 is locked to the end of arm 192 by a nut 195.

With this arrangement, in case of overpressure in the pump the piston 163 can yield by moving to the right, as seen in FIG. 15, against its return spring 194. However, the force of this spring is so calculated that it will not yield under the internal pressure, under normal pump operating conditions.

The longitudinal rod 193 controlling the movement of the aforesaid counter-piston 163 is slidably mounted in a bushing 197 rigid with cross member 186. At its end this rod sliding in a bearing 198 carries a pair of rollers 199 engaging a pair of grooves 201 of a hollow cam 202 revolving about the shaft 183.

From the foregoing it is clear that the rotation of cam 202 produces the reciprocation not only of rod 193 but also of piston 163.

The various components controlling the movement of piston 162 are so adjusted that when this piston is in its left-hand dead center position the right-hand end face 162a of piston 162 engages the cylinder 170 constituting the extension of member 166, whereby the inner chamber formed between the two pistons 162 and 163 can be filled with resin. When piston 162 is in its left-hand dead center position the counter-piston 163 is positioned as shown in FIG. 15 and blocks the port 169.

During the next portion of its rotation about the shaft 183 the bell crank 175 moves the piston 162 to the right until it engages the bore 164, thus trapping the metered quantity of resin between the two pistons 162 and 163. During this time the rod 193 and piston 163 are still stationary. When piston 162 engages the bore 164 it compresses the resin trapped in the chamber formed between the two pistons, and at a certain time the piston 163 is driven in turn to the right by rod 193, thus uncovering the port 169. The resin retained between the two pistons is then forced through said port 169 into the annular chamber 171 and then into the delivery or feed line 172 leading to the stirrer.

Now reference will be made to FIGS. 18 to 22 for describing a specific form of embodiment of the stirrer 143 shown in FIG. 14. This stirrer comprises a vertical, substantially cylindrical body 203 having connected to its lower portion one of the branches of the U-shaped pipe 144. A thermo-couple probe 204 is inserted through the wall of pipe 144 near the outlet of stirrer 143 to ascertain the temperature of the mixture issuing therefrom.

This stirrer 143 comprises on the other hand a rotor 205 solid with a vertical driving shaft 206. The rotor 205 comprises a central core 207 having secured in different transverse planes a plurality of stirring blades or arms 208. In this example the number of transverse blades or arms 208 contained in each horizontal set is four, but of course this number is not critical and a greater number of blades or arms may be provided if desired. These blades or arm 208 advantageously consist of spinned pins force-fitted in blind holes formed in the rotor core 207. If desired, they can be disposed tangent to a regular polygon, such as a square centered on the rotor axis. The arms 208 are thus set in two mutually perpendicular directions; they are symmetric by pair in relation to the rotor axis.

The stirrer body 203 further comprises on its inner surface stationary blades or arms 209 alternating with those 208 of the rotor core 207.

The shaft 206 of the stirrer has a conical point 211 at its lower end, which engages an axial bearing 212 carried by a spider 213. At its upper end the shaft 206 extends through a cover 214 fitted on the top of the body 203. This cover 214 has formed therein a transverse duct 215 leading to the space formed between the rotor 205 and the coaxial body 203 and connected to a pipe 216 which in turn is connected to the delivery duct 172 of the resin metering pump 139.

The resin is introduced via said duct 215 into the annular chamber 210 formed in said cover 214 above the annular space formed between the rotor 205 and body 203.

The upper portion of the core 207 of rotor 205 has a number of radial passages 217 formed therein, the depth of these passages increasing from the shaft 206 to the rotor periphery. These passages provide therebetween blade-forming ribs 220.

The shaft 206 extends through a bearing 218 housed in said cover 214 and formed on its inner surface with longitudinal grooves 219, as clearly shown in the detail FIG. 22.

Secured to the top of cover 214 is a block 221 having fitted therein a packing 222 for shaft 206. The shaft 206 is driven at its upper end by an electric motor (not shown). In the upper surface of cover 214 and the lower surface of block 221 a toroidal chamber 230 is formed which communicates through an annular groove 223 with the annular space formed between said shaft 206 and the assembly consisting of cover 214 and block 221. This toroidal chamber 230 is connected to a duct 224 communicating in turn with the metering pump 141 (FIG.

14) delivering the catalyst. The catalyst introduced under pressure into a pipe 224 thus fills up the toroidal chamber 230 and flows through the annular slot 223 into the space formed between shaft 206 and cover 214. It subsequently flows along the splines 219 of bearing 218 into the central portion of the centrifugal turbine constituted by the blades 220. The catalyst is then sprayed towards the lateral surface of body 203, and the catalyst and resin are mixed together by virtue of the stirring action produced by the movable arm 208 and fixed arms 209.

The block 221 is also provided with an annular chamber 225 surrounding the shaft 206 and communicating via a duct 226 with the metering pump 142 delivering the solvent, namely styrene. A lateral clearance is provided between shaft 206 and body 221 whereby the solvent introduced into the stirrer for obtaining the desired viscosity will follow the same path as the catalyst and also acts as a fluid for continuously cleaning the bearing 218 and prevent an accidental polymerization when the machine is not operating. The solvent thus introduced is also useful for lubricating the shaft packing 222.

A thermocouple probe 227 is disposed in the duct 215 supplying resin to the stirrer, in order to detect its temperature. This probe as well as the probe 204 at the outlet end of the stirrer, is part of a safety system adapted to detect possible critical conditions of operations likely to cause the resin to gel in the ducts and pipes.

Now a detailed description of the pressure control means shown diagrammatically at 245 in FIG. 14 will be given with reference to FIG. 23.

This device has its lower portion connected to the U-shaped pipe 144 communicating with the outlet end of the stirrer. The device comprises at its lower portion a substantially cylindrical body 241 formed with a conical valve seat 242 engaged by a ball valve 243. Secured to this body 241 is a sleeve 244 constituting its upper extension and having its upper end formed with an annular groove 244a of rounded radial contour.

An upper sleeve 245 having its lower end also formed with an annular groove 245a having a rounded radial contour is secured to the lower sleeve 244 by means of a plurality of tie-rods 247 interconnecting lock rings 248 and 249 holding the sleeves 244 and 245 against movement. Between the lock rings 248 and 249 a coaxial outer tube 251 of rigid, transparent material such as "Pyrex" glass is disposed; this tube 251 surrounds a coaxial inner resilient sleeve 252 for example of "Viton." This resilient sleeve 252 is retained at its lower end by an annular bead 253 consisting of a ring or wire having folded thereover the lower end of said inner sleeve 252, this bead being clamped between the upper end face of body 241 and a corresponding annular shoulder formed in the lower sleeve 244. Similarly, the upper end of the resilient sleeve 252 is folded over a ring or wire to form an annular bead 254 clamped in turn between the upper sleeve 245 and a bearing collar 255 disposed above the upper sleeve 245 and locked thereon by means of a nut 256.

The lower lock ring 248 has formed therein a duct 250 connected to a source of compressed air. This duct communicates through the clearance formed between the outer tube 251 and the lower sleeve 244 with the annular space 257 formed between the outer tube 251 and the central resilient sleeve 252.

During the operation of the apparatus compressed air is introduced through the duct 250 into the space 257 and the liquid pressure in the resilient sleeve 252 can be controlled by setting to a predetermined value the pressure prevailing outside this sleeve 252, i.e. in the space 257, this pressure value corresponding to the pressure at which the resin is injected into the head to be impregnated.

The pressure in space 257 is controlled by means of a pressure-gauge contact 258 connected through a pipe line 259 and a duct 261 formed in the upper lock ring 249 with the inner space 257.

Thus, if the pressure of the injected mixture increases, there is a risk of premature polymerization. In this case the pressure-gauge contact 258 will detect the abnormal pressure increment and control the operation of a safety device stopping the machine and automatically washing or rinsing the injection circuit by means of the solvent circulation.

Overlying the pressure control device consisting of the elements described hereinabove, is a transparent tube 262 secured between the bearing collar 255 and a corresponding upper collar 263 connected to the preceding one by means of longitudinal screws 264. A flexible hose 265 extends from the top end of tube 262 to the impregnation head. A thermocouple probe 266 is inserted into this pipe line for sensing the temperature of the mixture at this location.

Now a detailed description of a typical form of embodiment of the impregnation head 146 will be given with reference to FIGS. 24, 25 and 26. This impregnation head consists essentially of a pair of annular bodies 271, 272 assembled with each other by screws 270 and formed at their lower portion with a duct 273 connected to the pipe line 265 leading from the pressure control device of FIG. 23. This pipe line 273 opens into the annular chamber 147 formed one-half in body 271 and one-half in the other body 272. The resin and catalyst mixture will thus feed the lower portion of the impregnation head via said duct 273 and is subsequently caused to flow into the annular chamber 147 narrowing gradually towards the axis of tube T. The resin and catalyst mixture under pressure will thus penetrate into the reinforcing tapes of tube T during its passage through the impregnation head 146.

Sealing cushions or bladders 149 and 151 are disposed at the inlet and outlet end of the impregnation head 146. These cushions are exactly identical and therefore only one of them, i.e. cushion 151, will be described in detail hereinafter. It comprises a pair of co-axial sockets 274 and 275 disposed in axial alignment and assembled by means of an internally threaded socket 276. A resilient sleeve 277 engages the outer surface of tube T. One longitudinal end of sleeve 277 is folded about the downstream end of socket 275 and secured thereto by means of wires 278. The opposite end of socket 277 is folded about the upstream end of socket 274 and secured thereto by being wedged between a frustoconical surface formed in the body 272 and an annular wedge 279. This wedge 279 is pressed between the socket 274 and the body 272 by an annular flange 281 loosely and coaxially mounted on the socket 274. As clearly shown in FIG. 26, the socket 274 and body 272 are assembled by means of screw rods 282 extending through a flange 283 welded to socket 274 and screwed in the body 272. A nut 284 engaging the outer end of said rod is adapted to clamp the socket 274 against the body 272. On the other hand the annular flange 281 also receives therethrough similar screw rods 282 and is clamped against the body 272 by means of said annular wedge 279 with the assistance of a nut 285 also engages on each rod 282.

The resilient sleeve 277 constitutes a sealing cushion adapted to be distorted at will. During the impregnation period the internal annular space formed between the resilient sleeve 277, sockets 274 and 275, and the internally screw-headed socket 276, is filled with compressed air. To this end, a compressed-air line 280 connected to the internally screw-threaded socket 276 communicates with this inner space. On the other hand, when thicker sections of the tube T are to be passed through the impregnation head a vacuum is applied to the aforesaid inner space in order to retract the resilient sleeve 277.

At the upper portion of the impregnation head, i.e. opposite the input duct 273 supplying impregnation resin thereto, a pivoting valve 148 is disposed for avoiding any break in the supply of liquid.

This valve will now be described in detail with reference more particularly to FIGS. 27 and 28 of the drawings. This valve 148 comprises a valve member proper 291 of substantially tapered configuration, having its narrower lower end 292 engaged in the annular chamber 147 and hollowed out to provide blade means capable of stirring the liquid contained in this section of chamber 147. This valve member 291 engages a valve seat 293 mounted on the upper portions of said bodies 271 and 272 of the impregnation head. The valve 148 comprises on the other hand a body 294 having said valve seat 293 fitted in its lower portion, as shown in FIG. 27. A chamber 295 formed in said body 294 above the valve member 291 communicates with the outside.

The valve member 291 is rigid with a valve rod 296 in which a longitudinal through passage 297 is formed; this passage communicates at its lower end with chamber 295, via a transverse duct 298. The central passage 297 also communicates via another transverse duct 299 with a chamber 301 formed in said body 294 and communication via a duct 302 with a source of styrene under pressure (for example a reservoir filled with styrene and connected to a source of compressed air).

In its intermediate portion the valve rod 296 constitutes a piston 303 slidably fitted in a bore 304 of said body 294. The two chambers formed in said bore 304 above and below the piston 303 communicate through respective ducts 305 and 306 with a source of compressed air.

The body 294 has its top closed by a cover 307 through which the upper portion of the valve rod 296 is slidably mounted, by means of guide balls 308. This rod is driven for alternate rotation in either direction by asynchronous micromotor 309 and a link and crank-arm mechanism 311, 312.

When the impregnation head is operating under normal conditions the rotation of the asynchronous micromotor 309 produces a continuous oscillation of the valve rod 296 about its axis, whereby the valve member 291 is caused to perform the same movement on its seat 293. Thus, the liquid is constantly stirred by the blades 292, and therefore the undesired dead zones that would inevitably occur otherwise at the junction of the two circumferential fluid streams in the annular chamber 147 are safely avoided.

In case of emergency (accidental polymerization in the annular chamber 147) a pressure is transmitted via duct 306 to the lower face of piston 303, thus causing the valve rod 296 to rise and therefore unseating the valve member 291. The mixture contained in chamber 147 is thus discharged to the outside through chamber 295. At the same time, to avoid any upward flow of the mixture through the mechanism proper, styrene is introduced via duct 302 into chamber 301 and flows through ducts 299, 297 and 298 of valve rod 296 into chamber 295 where a hydraulic barrier is thus built up.

Now a typical form of embodiment of the various valve means of the impregnation system which are not shown in the general diagram of FIG. 14 will be described with reference to FIG. 29. These valves are disposed at different points along the circuits supplying solvent (styrene), catalyst and resin, and are controlled by pneumatic means. The valve illustrated in FIG. 29 comprises a tube 411 having one end rigid with an input T-union 412. This union 412 is fed with one of the liquids (solvent, catalyst or resin) utilized in the impregnation system.

Within the tube 411 is a coaxial tube 413 rigid with a socket 414 locked by means of a nut 415 fitting in an outer socket 416 rigid with said T-union 412, a suitable annular packing 417 being interposed therebetween.

The inner tube 413 is closed at its end 413a lying within the outer tube 411 and connected on the other hand to a source of compressed air. The portion of tube 413 which lies within the tube 411 is perforated as illustrated at 418. Slipped over the outer surface of tube 413 is a resilient sheath 419 of a length sufficient to extend considerably beyond the endmost holes 418. This resilient sheath 419 has its ends tightly clamped to the tube 413 by means of one or more resilient clamps or sockets. In the specific form of embodiment illustrated in FIG. 29 the resilient sheath 419 is retained on the tube 413, at either end, by means of a pair of resilient rings 420 and 421 of different lengths. As shown in this figure the innermost ring 420 is longer than ring 421 and extends beyond the endmost hole 418 towards the middle of the sheath 419.

The above-described valve operates as follows: In the absence of any compressed-air pressure in the tube 413 the sheath is urged against the tube surface and the liquid introduced through the input union 412 can flow through the annular space formed between the tubes 413 and 411 towards the outlet end of tube 411. Thus, the valve is open.

To close the valve, it is only necessary to apply a compressed-air pressure to the inside of tube 413 closed at its end 413a. This compressed air flows through the holes 418 into the space formed between the sheath 419 and the outer surface of tube 413, so as to inflate the sheath and cause same to assume roughly the shape shown in chain-dotted lines in FIG. 29. Under these conditions, the sheath 419 is pressed by the air pressure against the inner surface of tube 411, thus positively preventing the supply of fluid through the valve. Each internal ring 420 is thus submitted to an elastic distortion and caused to assume a substantially frustoconical configuration and permit a gradual variation in the radius of curvature of the distorted sheath 419.

Of course, the resilient holding rings 420 and 421 may consist of a single element having two different thicknesses in the longitudinal direction in order to constitute a relatively rigid base corresponding to the ring 421 and a resiliently deformable sleeve corresponding to the other ring 420.

The tube T thus impregnated with resin is subsequently introduced into the heating oven 37 of FIG. 1, which is preferably of the high-frequency type. This polymerization method is more adequate for relatively thick tube walls. In case of thinner tube walls an infrared radiation oven such as the oven 38 of FIG. 1 is sufficient. The length of the oven varies in proportion to the desired production rate. Control means may be provided to reduce or increase the heating power of the oven as a function of the tube output rate.

During the polymerization process, the tube is maintained under a relatively high tension due to the internal pressure prevailing in the space formed between the tube and the mandrel section 48 disposed downstream of packing 132. In FIG. 12 it will be seen that high-pressure compressed air, for example under a pressure of the order of 5 to 6 bars (72 to 87 p.s.i.) is introduced through the front face of the mandrel with a view to produce an adequate overstressing of the glass fibres during the polymerization step and increase the tube strength under high-pressure conditions.

However, the high-frequency heating polymerization of thermosetting plastic materials is attended by major inconveniences. In fact, with conventional high-frequency generators it is scarcely possible to accurately maintain the desired frequency and on the other hand no means capable of controlling the voltage across the electrodes are available for the time being, and this causes sparks to develop as a consequence of the perforation of the dielectric layer constituted by the material to be polymerized. Nevertheless, it may be noted that the polymerization time is but moderately increased if instead of constantly maintaining a high-frequency voltage rapid impulses are used, and that on the other hand disruptive effects are observed after the dielectric material has been exposed a certain time to the high-frequency field.

Now reference will be made to FIG. 30 to describe a high-frequency heating system capable of avoiding the inconveniences set forth hereinabove. This system comprises a high-frequency current generator 401 having its two output terminals connected to a pair of electrodes 402 (or a plurality of series-connected electrodes) between which the tube T consisting of the aforesaid wound glass fibre tapes impregnated with thermosetting resin is caused to travel. Due to the electrical field generated between the electrodes 402 this resin is polymerized and the tube hardened. Besides, semicircular auxiliary electrodes 403 and 404 are connected in parallel to the main heating electrodes 402. On the other hand, a D.C. motor 405 having a separate excitation winding 405a is provided for rotatably driving a support 406 for example of spider-like configuration. Secured to the outer ends of the arms of this spider-shaped support 406 are light-metal disks 407 electrically insulated from said support 406. The assembly is so designed that the disks 407 move past the fixed auxiliary electrodes 403 and 404. These electrodes constitute together with each disk 407 an adjustable capacitor having a capacity selected to constantly compensate the mistuning resulting from the presence of the material to be polymerized between the main heating electrodes 402.

With the above-described device high-frequency voltage impulses are obtained in the heating electrodes 402, the frequency of these impulses being adapted to be adjusted by properly modifying the separate excitation of the D.C. motor 405. In fact, the strength of the current absorbed by this high-frequency generator can be controlled by merely connecting a current transformer 408 in series with the feed circuit of this generator 401. If the current transformer 408 is connected to the excitation winding 405a of the D.C. motor 405, the velocity of rotation of the disks 407 can be controlled as a function of the current absorbed by the generator 401, this current increasing when the tuning takes place. Under these conditions the system may be so adjusted that the velocity of rotation of said D.C. motor 405 be reduced when actual tuning takes place. With the above-described arrangement, continuous high-frequency impulses are applied to the thermosetting material to be treated, these impulses having the maximum power at the selected frequency; the value of this frequency can be determined only by the test and try method for it depends on the thickness and quality of the material to be treated.

Experience teaches that to avoid breakdowns the velocity of rotation of the motor 405 should be increased as the thickness of the material to be polymerized decreases and the degree of polymerization of this material increases, and that the slower the feed rate of this material, the higher the motor speed.

After completion of the setting step the tube is fed to an automatic cutting system 41, in case sections having a predetermined length are desired. This station is equipped with diamond-coated disks or tungsten-carbide toothed saws, the saws moving around the tubes in the case of large-diameter tubes. The cutting equipment is mounted on a movable support travelling with the tube as the latter is being fed. The movement of the cutting-station equipment may be synchronized with the tube output rate by causing a driving clamp to be clamped on the tube itself.

To permit the cutting of the tube into sections without producing a pressure drop therein, a device of the type illustrated in FIG. 31 may be used. It will be seen that inside the tube T and downstream of the front wall of mandrel section 48 a piston 321 provided with two opposed cups fits against the inner wall of the tube and comprises a plunger extension 322 of smaller diameter, opposite to said mandrel section. This plunger rod 322 has a piston-forming flange-like end portion 323 in which axial holes 324 are formed, this portion 323 being slidably fitted in a cylindrical bore 325 formed in the central body 326 of an expansion valve formed with end transverse flanges 327 and 328 rigid with said body. The plunger rod 322 extends through one end flange 327 and a piston packing 329 is disposed therebetween, as shown.

A resilient sheath or bladder 331 has its end edges secured to the flanges 327 and 328 and surrounds the central body 326 in which one or more radial orifices 332 are formed. A suitable hydraulic fluid fills the space formed between the flanges 327, 328 and the sheath 331, and therefore the inner space of body 326.

A duct 333 extending through said flanges 327 and 328 interconnects the annular chamber 334 formed between said piston 321 and flange 327, and the internal space 335 constituted downstream of the other flange 328 between this flange and a fluid-tight stopper 336 fitted in the tube T at the outer end thereof. A duct 337 extends through this stopper 336 and is connected to a source of compressed air (not shown).

If the pressure exerted on the left-hand face of piston 321 produces a force greater than that resulting from the pressure prevailing in chamber 334, the plunger rod 322 is moved into chamber 325, thus increasing the pressure of the fluid contained therein and therefore causing the external elastic sheath or bladder 331 to be inflated. The pressure exerted against the left-hand face of piston 321 may be selected to have a value sufficient to cause the pressure exerted by the inflated elastic sheath 331 against the inner wall of the tube T to prevent the sliding movement of this sheath in the direction of the arrow $f$ of FIG. 29, i.e. from left to right, irrespective of the pressure exerted against the left-hand face of piston 321.

On the other hand, if a pressure is transmitted through the duct 337 of stopper 336 to chamber 335 and therefore to chamber 334, and if this pressure is such that the force resulting therefrom is in excess of that resulting from the pressure exerted against the left-hand face of piston 321, the latter is moved to the left in relation to flange 327, and its plunger rod 322 emerges from the chamber 325. Thus, the pressure in this chamber decreases and when the shoulder 323 of rod 322 engages the flange 327 the piston 321 carries along the resilient sheath 331 and the elements associated therewith to the left, i.e. in the direction of the arrow $f_1$.

Conversely, when the pressure in chamber 335 decreases, the pressure exerted against the left-hand face of piston 321 causes the sheath 331 to be inflated again, and the complete assembly is locked within the tube.

From the foregoing it will be seen that it is possible to feed the tube T by means of piston 321 during the tube manufacture, and to cause this piston to move upstream when it is desired to cut the finished tube into sections.

According to a modified form of embodiment the piston 321 may be pulled upstream by means of a piece of string or a cable wound on a reel at the downstream end of mandrel section 48. In this case the cable would actuate a valve controlling the deflation of the resilient sheath 331.

The tube sections cut in the automatic cutting station 41 are stacked as they emerge therefrom, the tube being constantly cut downstream of the tube driving device illustrated in FIG. 29. This device constantly remains inside the tube being manufactured and the stopper plug is moved during the cutting of each tube section without stopping the machine.

Although the present invention has been described in conjunction with a preferred embodiment and a few modifications therein, it is to be understood that further modifications and variations may be resorted to without departing from the spirit and scope of the invention, as those skilled in the art will readily understand. Such modifications and variations are considered to be within the purview and scope of the invention and appended claims.

What I claim is:

1. A machine for the continuous manufacture of a reinforced plastic tube, which comprises a plurality of stations for helically winding tapes of tube-reinforcing threads or fibres, means for impregnating said reinforcing tapes by using a polymerizable resin, a heating oven through which the tube consisting of the aforesaid resin-impregnated reinforcing tapes is caused to travel, a longitudinal mandrel extending through the greater part of the longitudinal dimension of the machine, a compressed-air feed duct provided in said mandrel for applying a pressure within the tube, said mandrel comprising a plurality of sections of a diameter corresponding substantially to the inner diameter of the tube being manufactured, said sections being interconnected by tubular members of smaller diameter, a section of said mandrel being provided at each one of said reinforcing tape helical-winding stations, at said impregnation means and along the greater part of the longitudinal dimension of said heating oven, and annular seals provided on some of said mandrel sections in order to isolate, in the inner space of the tube, zones in which different pressures prevail.

2. A machine according to claim 1, comprising a station for forming a fluid-tight sheath, a first section of said mandrel at said fluid-tight sheath-forming station, a station for proofing the fluid-tightness of said sheath, a second mandrel section at said fluid-tight sheath proofing station, first and second annular packings carried by said second mandrel section and forming therebetween and with the inner wall of the tube an annular chamber in which a pressure higher than the atmospheric pressure is maintained, a third mandrel section registering with a first station for helically winding reinforcing tapes, a third annular packing carried by said third mandrel section, a plurality of mandrel sections associated with the various tape helical-winding stations, a last mandrel section of relatively great length extending from the continuous impregnation station to the inside of said heating oven, and a fourth annular packing carried by said last mandrel section at a point located externally of said heating oven.

3. A machine according to claim 2, characetrized in that said fluid-tight sheath-forming station comprises a first mandrel section having a substantially oval cross-sectional configuration with two relatively flat opposed faces, on which said fluid-tight sheath consisting of at least one tape of plastic film is so wound that the tape edges overlap, an adhesive injection needle for injecting an adhesive substance which is engaged between the overlapping edges of said tape for introducing said adhesive substance therebetween, and means for continuously heating each thus cemented joint.

4. A machine according to claim 3, wherein said first mandrel section comprises two portions having different cross-sectional dimensions, namely a first portion of relatively small cross-sectional area followed by a second portion of relatively greater cross-sectional area.

5. A machine according to claim 4, comprising a transverse frame structure, transverse shafts pivotally mounted on said frame structure and rollers carried by said shafts and adapted to roll on said plastic film tape by bearing on the aforesaid first portion of relatively reduced cross-sectional area of said first mandrel section.

6. A machine according to calim 3, wherein each adhesive injection needle comprises an elongated block and a pair of vertical ducts formed therein and opening to the outside at the bottom end of said needle and comprising on the other hand a reservoir filled with said adhesive substance, a circulation pump and a pair of pipe lines connecting said reservoir and pump to said pair of vertical ducts formed in said adhesive injection needle, in order to produce therein a continuous circulation of said adhesive substance.

7. A machine according to claim 3, comprising a support on which said adhesive injection needle is mounted, and means for adjusting the position of said support in the transverse and vertical directions.

8. A machine according to claim 3, comprising a recess formed in said mandrel and registering with each adhesive injection needle, a sealing pad fitted in said recess, a ball mounted between said pad and the bottom of said recess, a cavity formed on the outer face of said sealing pad, a U-shaped groove surrounding said cavity, an inflatable sealing packing disposed in said U-shaped groove, and an external bearing block so arranged and shaped that the adhesive injection needle can be inserted between said bearing block and the cavity formed in said sealing pad.

9. A machine according to claim 3, comprising downstream of said adhesive injection needle a heating circuit housed in said mandrel along the flat side thereof where the tape edges constitute a fluid-tight sheath by overlapping each other with a view to set the layer of adhesive substance injected between said edges.

10. A machine according to claim 9, comprising a source of hot fluid and a heat transfer device incorporated in said mandrel and connected to said source of hot fluid.

11. A machine according to claim 3, comprising a pair of endless belts pressed against said flat sides of the mandrel, and means for driving said belts in order to move the plastic film tape constituting said fluid-tight sheath.

12. A machine according to claim 11, comprising external heating pads pressing at least one of said plastic film tape driving endless belts against the heat transfer device incorporated in said mandrel.

13. A machine according to claim 12, comprising cooling pads bearing against at least one of said fluid-tight sheath driving belts downstream of said heating pads, and a circuit supplying said cooling pads with cold fluid.

14. A machine according to claim 2 wherein said fluid-tightness proofing station comprises, externally of said sheath and around said second mandrel section carrying said first and second annular packings, a coaxial sleeve, a pair of ring packings carried by said sleeve and contacting the outer surface of said sheath, an air intake pipe opening into said sleeve, and a liquid filled vessel in which the free end of said air intake pipe is immersed.

15. A machine according to claim 2, wherein said station for continuously impregnating said tube reinforcing layers comprises reservoirs adapted to be filled with the components such for example as resin, catalyst and solvent of the impregnation mixture, feed pumps connected to said reservoirs, metering pumps capable of delivering a predetermined percentage of each component, a stirrer fed from said metering pumps, an impregnation liquid pressure control device connected to the outlet of said stirrer, an impregnation head of generally annular configuration through which said tube is caused to travel coaxially, and an annular impregnation chamber proper formed in said impregnation head and communicating with said pressure control device.

16. A machine according to claim 15, comprising, upstream of said continuous impregnation station, a reel adapted to deliver a tape constituting a friction filter, and means for shaping the tape paid off from said reel into a cylinder surrounding the tube before the passage of said tube through the impregnation head.

17. A machine according to claim 16, wherein each metering pump of the immersion type comprises a vessel adapted to contain the liquid component, a pump body immersed in the liquid, a bore formed in said pump body, a main piston and a counter-piston disposed in axial alignment in said bore, means for reciprocating said main and counter-pistons in said bore, a delivery duct, a port formed in the bore of said pump body whereby said pump body may communicate with said delivery duct, a cylinder constituting the external extension of said bore, said main piston being slidably mounted in said cylinder, said cylinder being adapted to be filled with liquid, the means controlling the reciprocating movements of said main piston and counter piston being adjusted to deliver a metered quantity of liquid into said delivery duct during each pumping cycle.

18. A machine according to claim 17, comprising a support mounted on said vessel, means for adjusting the longitudinal position of said support during the operation of the machine, a shaft mounted on said support, a bell-crank lever fulcrumed on said shaft, said main piston being pivotally connected to one arm of said lever, and means for inparting a reciprocating pivotal motion to said lever.

19. A machine according to claim 17, comprising a rod adapted to slide longitudinally, means adapted to impart a longitudinal reciprocating motion to said rod, and an arm rigid with sliding rod and having resiliently mounted thereon the counter-piston of said metering pump.

20. A machine according to claim 15, wherein said stirrer comprises a vertical cylindrical body, an outlet duct connected to the lower portion of said vertical cylindrical body, fixed blades projecting from the inner surface of said vertical cylindrical body and disposed in a plurality of axially spaced transverse planes, a vertical shaft extending into said vertical cylindrical body from the top thereof, means for rotatably driving said shaft, a coaxial rotor having its upper portion rigid with said driving shaft, movable blades rigid with said rotor and disposed in various transverse planes alternating with the planes comprising the fixed blades formed on the inner surface of said vertical cylindrical body of the stirrer, a cover closing the top of said cylindrical body, an annular chamber communicating with the upper portion of said stirrer body and formed in said cover, a resin feed duct opening into said annular chamber, and circuit means for introducing a catalyst along the rotor shaft.

21. A machine according to claim 20, wherein said stirrer comprises an upper bearing formed with longitudnal inner grooves and fitted in said cover, another auxiliary chamber overlying said bearing and communicating with the space formed between said rotor shaft and said bearing, a catalyst feed duct opening into said second annular chamber, and a turbine having radial blades formed on the upper portion of said rotor.

22. A machine according to claim 20, wherein said stirrer comprises a gland packing housed in said cover and receiving therethrough said rotor shaft and a solvent feed duct opening into the annular space formed between said shaft and the stirrer cover, below said gland packing.

23. A machine according to claim 20, comprising a first thermocouple probe disposed in the initial section of the output pipe line of said stirrer and a second thermocouple probe disposed in the resin feed duct at the input end of the stirrer.

24. A machine according to claim 15, wherein said impregnation liquid pressure control device comprises at its lower portion a ball valve adapted to permit the escape of liquid towards the impregnation head, a support comprising an external tube and a pair of lock rings adapted to hold the tube at its longitudinal ends, a resilient sheath coaxial with said tube and retained at its two longitudinal ends in said support for receiving the impregnation liquid therethrough, an annular chamber formed between said outer tube and said resilient sheath, a source of compressed air communicating with said annular chamber, and a contact pressure-gauge connected to said annular chamber for detecting any pressure increment within said resilient sheath.

25. A machine according to claim 15, wherein said impregnation head comprises two annular bodies assembled together and forming an annular impregnation chamber proper, a duct opening into the lower portion of said annular impregnation chamber and connected to said pressure control device, and a pivoting valve projecting into the upper portion of said annular chamber, that is, opposite the impregnation liquid inlet.

26. A machine according to claim 25, comprising two inflatable cushions disposed respectively at the inlet and outlet of said impregnation head, each inflatable packing comprising a pair of axially aligned sockets, an internally threaded coupling socket adapted to assemble said aligned coaxially sockets, a resilient sheath secured to the opposite ends of said pair of sockets, a source of vacuum and a source of compressed air, and means for alternately connecting said sources to the inner space formed between said resilient sheath, said pair of sockets and said internally-threaded socket.

27. A machine according to claim 26, comprising for each inflatable cushion a recess formed in one of the bodies of said impregnation head and in which one end of the resilient sheath of said inflatable cushion is wedged, a first annular flange rigid with said sleeve, a second flange disposed between said first flange and said body, an annular wedge disposed between said second flange and the recess formed in said body, screw rods secured to said body and extending through said first and second flanges, and lock nuts screwed on said rods.

28. A machine according to claim 25, wherein said pivoting valve provided at the upper portion of said impregnation chamber comprises a valve member proper of substantially tapered configuration, a seat of mating shape engaged by said valve member, and blade means formed at the inner and lower end of said valve members which projects into said annular chamber, in order to stir the liquid in said impregnation chamber.

29. A machine according to claim 28, comprising a valve body disposed above said valve seat, a double-acting pneumatic cylinder formed in said body, a piston slidably mounted in said cylinder, a rod rigid with said piston and also with said valve member, a chamber formed in said valve body above said valve member, means for connecting said chamber to the outside, a first transverse duct formed through said piston rod and opening into said chamber, a longitudinal duct formed in said piston rod and communicating with said first transverse duct, a second transverse duct formed in said piston rod and communicating with said longitudinal duct, a second chamber formed in said valve body and into which said second transverse duct of said piston rod is caused to open, and a source of solvent under pressure connected to said second chamber.

30. A machine according to claim 29, comprising an asynchronous micromotor driving the pivoting valve member of said valve means so as to impart an alternating pivotal motion thereto.

31. A machine according to claim 15, wherein each valve of said impregnation device, of the pneumatic control type, comprises a pair of coaxial internal and external tubes forming therebetween an annular space through which a liquid may circulate, the inner tube being closed at one end, a source of compressed air communicating with the inside of said inner tube, holes formed through the wall of said inner tube along one section thereof, a resilient sheath extending on said perforated section of said inner tube, and means for firmly clamping the ends of said resilient sheath on said inner tube.

32. A machine according to claim 31, comprising at either end of said resilient sheath on said inner tube of the valve at least one resilient ring comprising a first elastic portion extending towards the center of said sheath beyond the endmost hole formed in the wall of said inner tube, and another rigid portion firmly holding the end of said external sheath against said inner tube.

33. A machine according to claim 1, comprising a high-frequency current generator, main heating electrodes between which the tube impregnated with the thermosetting resin to be polymerized is adapted to travel, said main electrodes being connected to the output terminal of said high-frequency current generator, a pair of auxiliary electrodes connected in parallel to said main heating electrodes, a direct-current electric motor of the separate excitation winding type, a support rotatably driven from said electric motor, movable metal disk mounted on said support and adapted to move past said pair of auxiliary electrodes in order to apply high-frequency impulses to said main heating electrodes, the variable frequency of said impulses being a function of the velocity of rotation of said motor.

34. A machine according to claim 1, wherein a fluid-tight stopper locked inside the tube is adapted to drive said tube to the output end of the machine by using the compressed-air pressure prevailing in the space formed between the front face of said mandrel and said fluid-tight stopper, which comprises a piston formed with a pair of opposed sealing cups and housed in said tube between said stopper and the mandrel end face, a rod-extension of said piston opposite to said mandrel, a piston-forming flange rigid with one end of said rod opposite to said piston, axial holes formed through said piston-forming flange, a central socket disposed inside the tube and transverse flanges rigid with said central socket and having their outer periphery in sliding contact with the inner surface of the tube, said transverse flanges and said socket forming therebetween a closed cylindrical chamber in which said piston-forming flange of said piston rod is slidably fitted, a resilient sheath secured at its two longitudinal ends to said transverse flanges so as to surround said central socket, at least one hole formed through the wall of said socket to provide a fluid connection between said cylindrical chamber and the space surrounding said central socket, the inner space of said resilient sheath and said cylindrical chamber being adapted to be filled with hydraulic fluid, a duct extending through said transverse flanges and adapted to connect the annular chamber formed between said two-cup piston and one of said transverse flanges to the inner space formed between the other transverse flange and the fluid-tight stopper disposed downstream thereof, an axial duct formed through said fluid-tight stopper and opening into the inner space formed between said other transverse flange and said stopper, and a source of compressed air connected to said axial duct.

References Cited

UNITED STATES PATENTS

| | | | |
|---|---|---|---|
| 1,544,546 | 7/1925 | Baker | 156—425 |
| 3,376,180 | 4/1968 | Larson et al. | 156—425 |
| 3,453,163 | 7/1969 | Mills et al. | 156—425 |

BENJAMIN A. BORCHELT, Primary Examiner

T. H. WEBB, Assistant Examiner

U.S. Cl. X.R.

156—184